(12) United States Patent
Moon et al.

(10) Patent No.: US 12,081,558 B2
(45) Date of Patent: Sep. 3, 2024

(54) DISTRIBUTED SECURITY IN A SECURE PEER-TO-PEER DATA NETWORK BASED ON REAL-TIME GUARDIAN PROTECTION OF NETWORK DEVICES

(71) Applicant: WhiteStar Communications, Inc., Durham, NC (US)

(72) Inventors: Billy Gayle Moon, Apex, NC (US); William Victor Moon, Chapel Hill, NC (US)

(73) Assignee: WhiteStar Communications, Inc., Durham, NC (US)

( * ) Notice: Subject to any disclaimer, the term of this patent is extended or adjusted under 35 U.S.C. 154(b) by 180 days.

(21) Appl. No.: 17/361,501

(22) Filed: Jun. 29, 2021

(65) Prior Publication Data
US 2022/0417252 A1 Dec. 29, 2022

(51) Int. Cl.
*H04L 9/40* (2022.01)

(52) U.S. Cl.
CPC ........ *H04L 63/108* (2013.01); *H04L 63/0442* (2013.01); *H04L 63/068* (2013.01); *H04L 63/1416* (2013.01)

(58) Field of Classification Search
CPC . H04L 63/0442; H04L 63/068; H04L 63/108; H04L 63/1416; H04L 63/0846; H04L 2463/062; H04L 63/0435
See application file for complete search history.

(56) References Cited

U.S. PATENT DOCUMENTS

| | | | |
|---|---|---|---|
| 7,792,989 B2 | 9/2010 | Toebes et al. | |
| 7,818,607 B2 | 10/2010 | Turner et al. | |
| 8,225,091 B1 * | 7/2012 | Pimentel | G06F 21/554 713/193 |
| 9,807,102 B1 * | 10/2017 | Modras | H04L 63/105 |
| 10,419,931 B1 * | 9/2019 | Sohail | H04L 63/1425 |
| 11,088,835 B1 * | 8/2021 | Wilbur | H04L 9/14 |
| 2003/0163697 A1 * | 8/2003 | Pabla | H04L 9/0838 713/171 |
| 2003/0204716 A1 * | 10/2003 | Rockwood | H04L 63/0428 348/E7.071 |
| 2006/0053289 A1 * | 3/2006 | Singh | H04L 9/321 713/169 |

(Continued)

OTHER PUBLICATIONS

Society video, "SOCIETY Secure Messenger: The world's most secure way to chat", Text and Screenshots, (Mar. 10. 2020), [online], [Retrieved on Mar. 3, 2022]. Retrieved from the Internet: URL: <https://www.youtube.com/watch?v=jSRmnseSCVA>, 9 pages.

(Continued)

*Primary Examiner* — Daniel B Potratz
*Assistant Examiner* — Matthias Habtegeorgis
(74) *Attorney, Agent, or Firm* — Leon R. Turkevich

(57) ABSTRACT

In one embodiment, a method comprises: securing, by a security agent executed within a network device, first secure data structures for secure storage in the network device and second secure data structures for secure communications in a secure peer-to-peer data network; monitoring, by the security agent, a corresponding mandatory lifecycle policy for each of the first secure data structures; and cryptographically erasing one of the first secure data structures in response to expiration of the corresponding mandatory lifecycle policy.

23 Claims, 15 Drawing Sheets

(56) References Cited

U.S. PATENT DOCUMENTS

| | | | | |
|---|---|---|---|---|
| 2010/0031343 | A1* | 2/2010 | Childress | G06F 21/46 726/18 |
| 2010/0217992 | A1* | 8/2010 | Hamlin | G06F 21/725 726/20 |
| 2016/0316367 | A1* | 10/2016 | Rose | H04B 5/0056 |
| 2017/0111335 | A1* | 4/2017 | Hibbert | H04L 63/083 |
| 2017/0111368 | A1* | 4/2017 | Hibbert | H04L 63/102 |
| 2018/0332079 | A1* | 11/2018 | Ashley | H04L 63/20 |
| 2019/0007447 | A1* | 1/2019 | Barnes | H04L 63/306 |
| 2019/0213319 | A1* | 7/2019 | Gerebe | H04L 63/12 |
| 2019/0354709 | A1* | 11/2019 | Brinskelle | G06F 21/31 |
| 2020/0274699 | A1* | 8/2020 | Watson | H04L 9/14 |
| 2020/0366648 | A1* | 11/2020 | Kuppannan | H04L 63/0263 |
| 2020/0396259 | A1* | 12/2020 | Schory | H04L 63/105 |
| 2021/0022043 | A1* | 1/2021 | Soryal | H04L 63/0876 |
| 2021/0026535 | A1 | 1/2021 | Moon | |
| 2021/0026976 | A1 | 1/2021 | Moon | |
| 2021/0028940 | A1 | 1/2021 | Moon | |
| 2021/0028943 | A1 | 1/2021 | Moon | |
| 2021/0029092 | A1 | 1/2021 | Moon | |
| 2021/0029125 | A1 | 1/2021 | Moon | |
| 2021/0029126 | A1 | 1/2021 | Moon | |
| 2021/0081524 | A1 | 3/2021 | Moon | |
| 2022/0066860 | A1* | 3/2022 | Sloane | G06F 16/2468 |
| 2022/0253526 | A1* | 8/2022 | Sanders | G06F 21/566 |
| 2023/0033192 | A1 | 2/2023 | Sutherland et al. | |

OTHER PUBLICATIONS

Society video, "Complete AI Security", Text, Transcript, and Screenshots, (Mar. 19, 2020), [online], [Retrieved on Mar. 3, 2022]. Retrieved from the Internet: URL: <https://www.youtube.com/watch?v=5U2khXXcDMo>, 16 pages.

Society video, "Society's Best in Class Security and the Cohort System", Text, Transcript, and Screenshots, (Mar. 26, 2020), [online], [Retrieved on Mar. 3, 2022]. Retrieved from the Internet: URL: <https://www.youtube.com/watch?v=dwUlktWMMoc>, 11 pages.

Society video, "SOCIETY Tutorial 6 : Advanced Controls", Transcript and Screenshots, (Apr. 6, 2020), [online], [Retrieved on Mar. 3, 2022]. Retrieved from the Internet: URL: <https://www.youtube.com/watch?v=5jlVTcQmADw>, 5 pages.

Society video, "SOCIETY Tutorial 5: Conversation Controls", Transcript and Screenshots, (Apr. 6, 2020), [online], [Retrieved on Mar. 4, 2022]. Retrieved from the Internet: URL: <https://www.youtube.com/watch?v=v6uDbsFPqhc>, 11 pages.

Society video, "Creating a Conversation", Transcript and Screenshots, (Apr. 6, 2020), [online], [Retrieved on Mar. 4, 2022]. Retrieved from the Internet: URL: <https://www.youtube.com/watch?v=irvX9ZyaPLM>, 4 pages.

Society video, "SOCIETY Tutorial Part 7 : Notifications and Misc", Transcript and Screenshots, (Apr. 6, 2020), [online], [Retrieved on Mar. 4, 2022]. Retrieved from the Internet: URL: <https://www.youtube.com/watch?v=muxTsR1PvZA>, 7 pages.

"4-Way Handshake", Jan. 24, 2019, [online], [retrieved on Jun. 1, 2021]. Retrieved from the Internet: https://www.wifi-professionals.com/2019/01/4-way-handshake>, pp. 1-21.

Thubert, Ed., et al., "Address Protected Neighbor Discovery for Low-Power and Lossy Networks", [online], 6lo Internet Draft, Feb. 23, 2018, [retrieved on Oct. 30, 2018]. Retrieved from the Internet: URL: <https://tools.ietf.org/pdf/draft-ietf-6lo-ap-nd-06.pdf>, pp. 1-22.

Lehembre, "Wi-Fi-security—WEP, WPA and WPA2", Jun. 2005, [online], [retrieved on Jun. 1, 2021]. Retrieved from the Internet: URL: <http://tele1.dee.fct.unl.pt/rit2_2015_2016/files/hakin9_wifi_EN.pdf>, 14 pages.

Leach et al., "A Universally Unique IDentifier (UUID) URN Namespace", Network Working Group, Request for Comments: 4122, Jul. 2005, [online], [retrieved on May 20, 2021]. Retrieved from the Internet: URL: <https://www.rfc-editor.org/rfc/pdfrfc/rfc4122.txt.pdf>, pp. 1-32.

Winter, Ed., et al., "RPL: IPV6 Routing Protocol for Low-Power and Lossy Networks", Internet Engineering Task Force (IETF), Request for Comments: 6550, Mar. 2012, pp. 1-157.

Thubert, Ed., et al., "Registration Extensions for IPV6 over Low-Power Wireless Personal Area Network (6LoWPAN) Neighbor Discovery", [online], Internet Engineering Task Force (IETF), Request for Comments: 8505, Nov. 2018, [retrieved on Nov. 16, 2018]. Retrieved from the Internet: <https://tools.ietf.org/pdf/rfc8505.pdf>, pp. 1-47.

Moon, U.S. Appl. No. 17/361,538, filed Jun. 29, 2021.

Moon, U.S. Appl. No. 17/361,593, filed Jun. 29, 2021.

Callas et al., "OpenPGP Message Format", Network Working Group, Request for Comments: 4880, Nov. 2007, [online], [retrieved on Oct. 28, 2021]. Retrieved from the Internet: URL: <https://www.rfc-editor.org/rfc/pdfrfc/rfc4880.txt.pdf>, pp. 1-90.

Society video, "Society Tutorial 1: Setting Up and Making a Connection", Transcript and Screenshots, (Jun. 29, 2020), [online], [Retrieved on Mar. 4, 2022]. Retrieved from the Internet: URL: <https://www.youtube.com/watch?v=4k8cYbv-Of0>, 15 pages.

\* cited by examiner

DISTRIBUTED SECURITY IN A SECURE PEER-TO-PEER DATA NETWORK BASED ON REAL-TIME GUARDIAN PROTECTION OF NETWORK DEVICES

STATEMENT REGARDING PRIOR DISCLOSURES BY THE INVENTOR OR A JOINT INVENTOR

The following U.S. Patent Publications do not qualify as prior art under 35 USC 102(b)(1)(A) because their Jan. 28, 2021 publications are (1) one year or less before the effective filing date of the claimed invention, and (2) by the inventor or a joint inventor: U.S. Pub. 2021/0026535; U.S. Pub. 2021/0026976; U.S. Pub. 2021/0028940; U.S. Pub. 2021/0028943; U.S. Pub. 2021/0029092; U.S. Pub. 2021/0029125; and U.S Pub. 2021/0029126, the disclosures all of which are incorporated herein by reference to the extent not inconsistent with this application.

U.S. Patent Publication 2021/0081524, the disclosure of which is incorporated herein by reference to the extent not inconsistent with this application, also does not qualify as prior art under 35 USC 102(b)(1)(A) because its Mar. 18, 2021 publication is (1) one year or less before the effective filing date of the claimed invention, and (2) by the inventor or a joint inventor.

TECHNICAL FIELD

The present disclosure generally relates to distributed security in a secure peer-to-peer data network based on a real-time guardian protection of network devices.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Protocol (IP) has enabled the Internet to evolve from a set of connected research institutions and universities to a world wide web of connected IP devices that enables worldwide communications between user-controlled devices ("user devices"), Internet of Things (IoT) devices (devices that do not require user control), and server devices providing ever-increasing cloud-based based services such as social networking services, business transaction services, media distribution services, data storage services, etc. The enormous success of the Internet is based on the deployment of IP routing protocols that enable a "source" device (having a corresponding "source IP address") that is connected to the Internet to reach a "destination" device (having a corresponding "destination IP address") that also is connected to the Internet.

This universal reachability also has introduced severe security threats to each and every IP device that is connected to the Internet, because any "threat device" originating at a "source" IP address (e.g., a malfunctioning network device infected by malware or a network device operated by a malicious user) can threaten any "target device" at a "destination" IP address in an attempt to steal private data, disrupt the target device, etc. Hence, this universal reachability has resulted in losses on the order of billions (or even trillions) of dollars in losses due to attacks on targeted devices, including attacks on personal devices, as well as attacks on large-scale corporate, government, and/or military networks. Individuals and institutions collectively have expended billions of dollars in network security in an attempt to thwart or mitigate against online attacks, yet malicious users still have been able to overcome network security attempts.

Cyber-security has historically been based on a three-pronged approach (a "three-legged stool"): protection of information; attempting to detect a threat ("cyber-attack") (preferably in real time) and attempting to notify another party of the threat; and attempting to identify whether any actionable operations can be executed to stop or at least mitigate the detected threat.

Prior cyber-security proposals have offered protection of information that is "in-flight" (i.e., during transmission from a transmitting network device to a receiving network device via a wired or wireless communications medium). However, such prior cyber-security proposals have failed to secure data "at rest" during storage within a memory circuit; such prior cyber-security proposals also have no ability to monitor in real time whether a network device is currently under a threat (i.e., currently suffering a cyber-attack); consequently, such prior cyber-security proposals are incapable of executing any action to stop or mitigate the detected threat in real time. Such prior cyber-security proposals also fail to provide adaptive security that can learn from prior cyber-attacks.

BRIEF DESCRIPTION OF THE DRAWINGS

Reference is made to the attached drawings, wherein elements having the same reference numeral designations represent like elements throughout and wherein.

Figure 1:
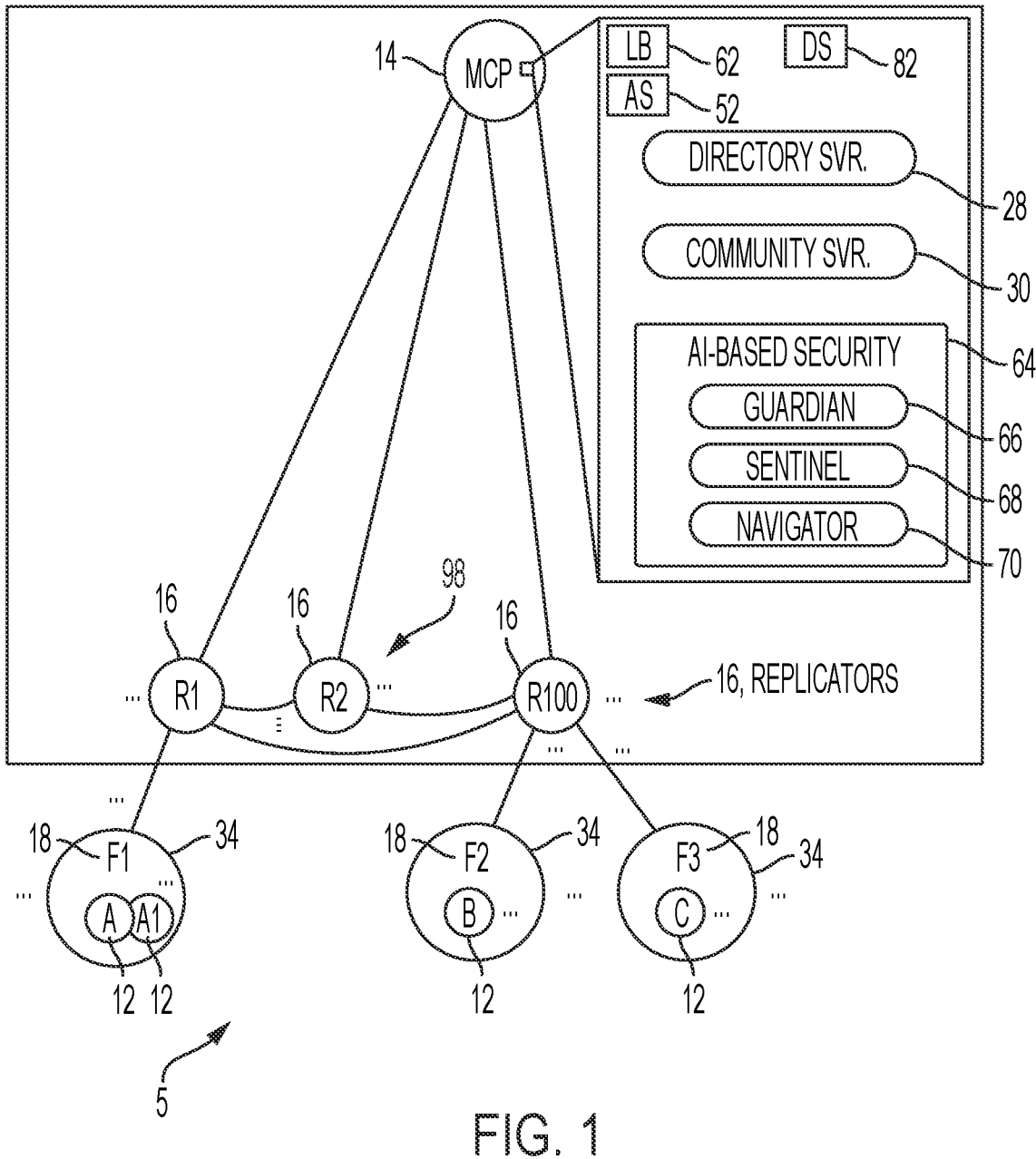
FIG. 1 illustrates a secure peer-to-peer data network comprising an apparatus for registering endpoint devices of requesting users based on establishment of two-way trusted relationships, including executing a distributed artificial intelligence (AI) based security suite of real-time protection, real-time threat detection, and real-time secure connection management, according to an example embodiment.

DESCRIPTION OF EXAMPLE EMBODIMENTS
OVERVIEW

In one embodiment, a method comprises: securing, by a security agent executed within a network device, first secure data structures for secure storage in the network device and second secure data structures for secure communications in a secure peer-to-peer data network; monitoring, by the security agent, a corresponding mandatory lifecycle policy for each of the first secure data structures; and cryptographically erasing one of the first secure data structures in response to expiration of the corresponding mandatory lifecycle policy.

In another embodiment, one or more non-transitory tangible media is encoded with logic for execution by a machine and when executed by the machine operable for: securing, by the machine implemented as a network device, first secure data structures for secure storage in the network device and second secure data structures for secure communications in a secure peer-to-peer data network, the one or more non-transitory tangible media implemented as a security agent; monitoring a corresponding mandatory lifecycle policy for each of the first secure data structures; and cryptographically erasing one of the first secure data structures in response to expiration of the corresponding mandatory lifecycle policy.

DETAILED DESCRIPTION

Particular embodiments enable scalable deployment of a secure peer-to-peer data network based on distributed execution, in each physical network device of the secure peer-to-peer data network, of an artificial intelligence (AI) based security suite providing real-time protection, real-time threat detection, and real-time secure connection management. Each physical network device is required to install and execute a secure executable container (e.g., a "network operating system") that is required for any access to the secure peer-to-peer data network.

The secure executable container includes, as real-time protection in the artificial intelligence (AI) based security suite, a first executable security agent ("guardian") configured for providing AI-based expertise in secure policy enforcement of executable code within the secure executable container, securing "at-rest" data structures as first secure data structures for secure storage in the network device, and securing "in-flight" data structures as second secure data structures for secure communications in the secure peer-to-peer data network. The guardian security agent also can execute machine learning (ML) to ensure its real-time protection operations are sufficient to withstand existing and newly-discovered cyber threat techniques, for example based on autonomic synchronization with peer guardian security agents in other network devices in the secure peer-to-peer data network.

The secure executable container also includes, as real-time threat protection in the AI based security suite, a second executable security agent ("sentinel") providing AI-based expertise in a real-time detection of a cyber threat in the network device, and real-time execution of a corrective action to at least mitigate (if not remove) the cyber threat based on machine learning-based decisions upon evaluation of the cyber threat: if necessary, the sentinel security agent executed in the physical network device can execute a cryptographic "self-destruction" of the physical network device in response to detecting a "persistent consistent threat", in order to halt any further spread of the persistent consistent threat to other physical network devices in the secure peer-to-peer data network. The sentinel security agent also can execute machine learning (ML) to ensure its real-time detection and correction operations are sufficient to withstand the existing and newly-discovered cyber threat techniques, for example based on autonomic synchronization with peer security agents in other network devices in the secure peer-to-peer data network.

The secure executable container also includes, as real-time secure connection management in the AI based security suite, a third executable security agent ("navigator") providing AI-based expertise in real-time tracking and risk-assessment of available wireless data networks. The navigator security agent can determine, for each of the available wireless data networks, a corresponding machine learning (ML) based risk assessment that identifies a corresponding risk in encountering a cyber threat on the corresponding wireless data network. Hence, the navigator security agent can "navigate" among available wireless data networks to supply a recommendation (e.g., to the guardian security agent and/or the sentinel security agent) for connecting to a "safe" data link and avoiding a "hazardous" data link susceptible to cyber threats.

Hence, the security agents "guardian", "sentinel", and "navigator" can provide respective AI-based expert operations based on executing machine learning on specific cyber threat features for identification of AI-based security decisions. The security agents "guardian", "sentinel", and "navigator" also can share among each other the AI-based security decisions, thereby providing an integrated and coordinated "division of labor" among the security agents. In one example, the sentinel security agent can respond to a detected replay attack or a detected "zombie" attack on a local data link (e.g., a public WiFi "hotspot") by sending a query to the navigator security agent to determine if a trusted destination endpoint device is reachable via a safer data link; the navigator security agent can recommend to the sentinel security agent a safer wireless data link (e.g., a private WiFi "hotspot" or a peer-to-peer (P2P) wireless data link) having a lower risk in encountering a cyber threat, enabling the sentinel security agent to maintain secure communications with the trusted destination endpoint device via the safer wireless data link. In another example, the security agents "guardian", "sentinel", and "navigator" can share cyber-attack feature data for coordinating improved ML-based decision tree operations in acting on newly-discovered cyber-attacks.

Moreover, the security agents "guardian", "sentinel", and "navigator" can execute autonomic synchronization with peer security agents in other network devices in the secure peer-to-peer data network: the autonomic synchronization not only enables an autonomic aggregation of machine learning-based feature data (e.g., cyber-attack feature data, wireless network feature data) in the secure peer-to-peer data network; the autonomic synchronization also enables distributed execution of corrective actions, including cryptographically removing a cyber threat at its source (e.g., an endpoint device utilized by a "malicious user"), as appropriate, and selectively reducing or eliminating an influence or effect of the cyber threat at targeted network devices (e.g., enabling targeted users to reduce or revoke a trusted two-way relationship with the malicious user).

Hence, the secure executable container that provides the AI based security suite comprising the security agents "guardian", "sentinel", and "navigator" can provide scalable security for the physical network device in the secure peer-to-peer data network. Moreover, the secure executable container can prevent any executable resource in the physical network device (and the user of the physical network device) from accessing any of the "at-rest" or "in-flight" secure data structures, any executable code within the secure executable container, or the secure peer-to-peer data network, without authorized access via a prescribed Application Programming Interface (API) required by the secure executable container.

Hence, the example embodiments provide a scalable establishment and AI-based enforcement of a secure peer-to-peer data network that cannot be hacked successfully: as a last resort any network device involved in a cyber-attack can be subject to a cryptographic "self-destruction" that prevents any cyber-attack from extending into the secure data network.

A description will first be provided of the secure peer-to-peer data network and the secure identity management system, followed by a description of the AI-based security suite (comprising the guardian security agent, the sentinel security agent, and the navigator security agent) providing distributed security between two-way trusted network devices in a secure peer-to-peer data network.

Secure Private Core Network Overview

FIG. 1 illustrates a secure data network 5 comprising an example secure private core network 10, according to an example embodiment. The secure private core network 10 is: a (1) cloudless (2) hybrid peer-to-peer overlay network that (3) can utilize artificial intelligence (AI) to extend security features and operations beyond end-to-end encryption between two endpoint devices 12, for example wireless smartphone devices, wireless smart tablet devices, wireless Internet of Things (IoT) devices, etc. The secure private core network 10 comprises a master control program (MCP) device 14, and one or more replicator devices (e.g., "R1") 16. Each replicator device 16 can be connected to every other replicator device 16, forming a pairwise topology (e.g., a "mesh") 98 of interconnected replicator devices 16; each replicator device 16 also is connected to the MCP device 14; hence, each replicator device 16 provides a connection to zero or more endpoint devices 12 for reaching the MCP device 14 and/or another endpoint device 12, described in further detail below. The devices 12 also can have peer to peer connections to one another allowing direct communications without the aid of the core network 10 (hence the name hybrid peer to peer network). Devices 12 can simultaneously communicate either exclusively with each other, peer to peer, with some devices peer to peer and other devices via the core network 10 or with all other devices 12 via the core network 10.

The peer-to-peer network in the secure private core network 10 is based on a trusted aggregation of strict two-way trusted relationships ("cohorts") between two entities: an "entity" can be based on a physical device (e.g., an endpoint device 12 or a physical network device in the secure private core network 10 such as the MCP device 14) having a verified secure relationship with at least an individual person utilizing the physical device; the verified secure relationship also can be with an identified organization associated with the physical device (e.g., a prescribed manufacturer of an endpoint device 12 such as an IoT device, a service provider offering services based on purchase or rental of an endpoint device 12, etc.); the verified secure relationship also can be with another physical device attempting a communication with the physical device (e.g., a physical device executing the MCP device 14 and/or the replicator device 16, another endpoint device 12, etc.). Hence, the secure private core network 10 requires establishment of a strict two-way trusted relationship between two physical devices (also referred to as a "cohort"), where each physical device either is operated by a user, or is a physical device associated with an identified organization (including a corresponding physical device executing the MCP device 14).

Since an individual person (or identified organization) may utilize one or more endpoint devices 12 for network communications, the secure private core network 10 can identify an individual person (or identified organization) based on the allocation of a "federation" identifier (illustrated as "F1") 18 that has a verified secure relationship with one or more physical network devices (e.g., "A" 12, "A1" 12, etc.) that are utilized by the individual person (or identified organization) for communications within the secure data network 5; hence, the secure data network 5 also is referred to herein as a "secure peer-to-peer data network" based on the trusted aggregation of two-way trusted relationships. As described below, the federation ID 18 is generated by an endpoint device 12 during initial registration of a user (e.g., individual person or identified organization) using a secure random number generator that results in a universally unique identifier (UUID) of at least one-hundred twenty eight (128) bits: an example 128-bit UUID can be implemented as proposed by the Internet Engineering Task Force (IETF) (see RFC 4122).

Figure 2:
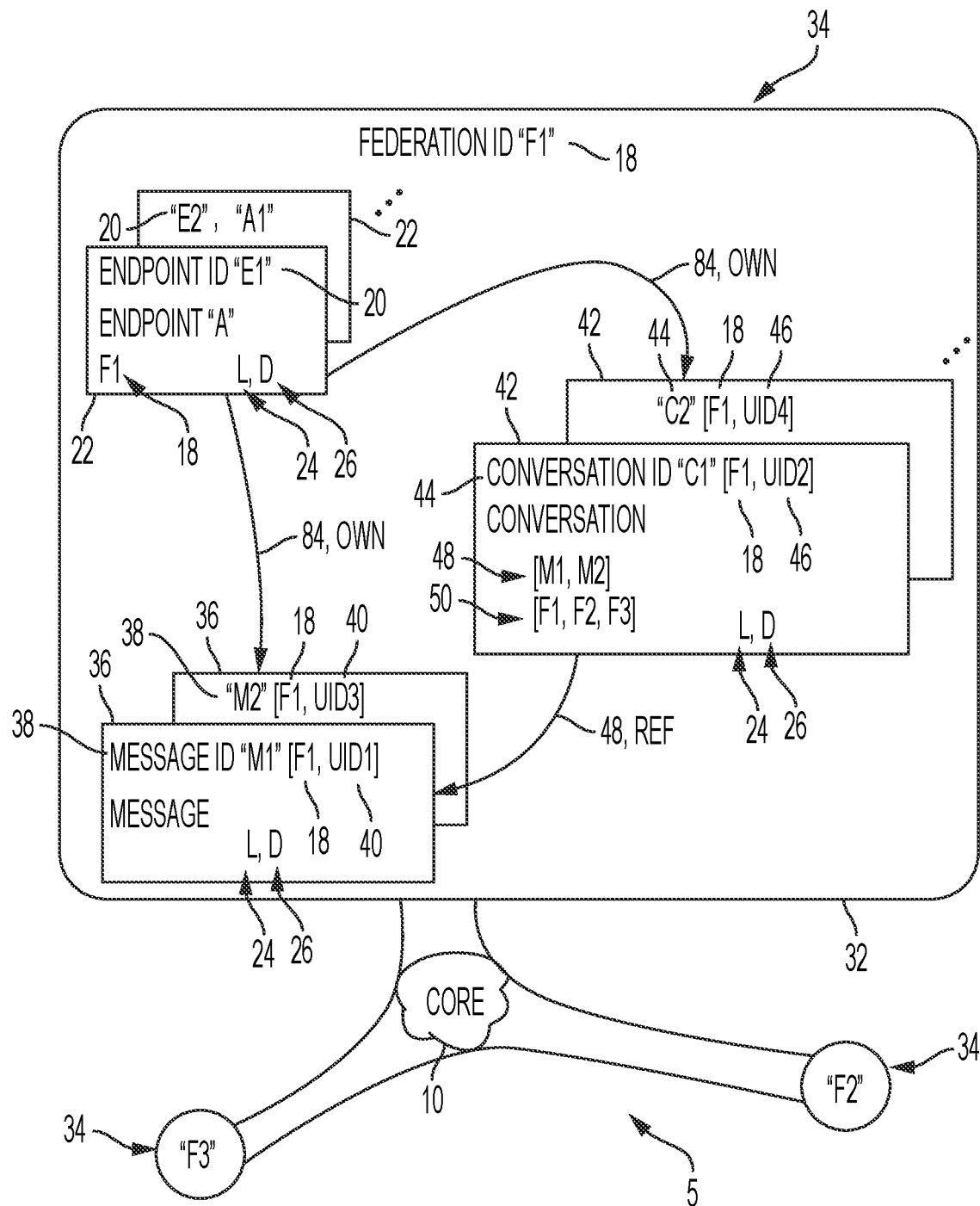
FIG. 2 illustrates example data structures generated and/or stored by an endpoint device associated with a federation identifier owned by a requesting user, for establishment and maintenance of two-way trusted relationships in the secure peer-to-peer data network, according to an example embodiment.

FIG. 2 illustrates example data structures that can identify secure relationships between different entities, for example different endpoint devices 12, different individual persons or organizations, etc. The secure private core network 10 causes each endpoint device 12 during registration with the secure private core network 10 to securely and randomly generate its own self-assigned 128-bit UUID as a unique endpoint identifier 20: the endpoint ID 20 is stored in a data structure referred to as an endpoint object 22 that stores all attributes associated with the corresponding endpoint device 12 in the secure data network 5. As illustrated in FIG. 2 and as described in further detail below, the secure private core network 10 can cause the endpoint device "A" 12 to generate its own endpoint identifier "E1" 20; the secure private core network 10 also can cause the endpoint device "A1" 12 to generate its own endpoint identifier "E2" 20. The endpoint ID 20 provides a permanent (i.e., unchangeable) cryptographically-unique identity for the endpoint device "A" 12.

Each physical device, including each endpoint device 12, is uniquely identified in the secure private core network 10 based on its corresponding endpoint object 22. The endpoint object 22 for each physical device can specify its corresponding endpoint ID 20, the federation ID 18 of the federation 34 to which the physical device belongs, a corresponding lifecycle policy "L" 24, and a corresponding distribution policy "D" 26, described below. The endpoint object 22 for each physical device also can identify a corresponding device type, for example a "human interface" (user interface device), a "thing" (e.g., IoT device, mass storage device, processor device), or a core network component (e.g., an MCP device 14, a replicator device 16, a directory server 28, a community server 30, etc.); hence, a particular device type as specified in the endpoint object 22 can cause the corresponding physical device (e.g., an endpoint device 12), to be allocated or granted selected attributes within the secure private core network 10. Each endpoint object 22 is securely stored in its corresponding physical device in which it represents, and also can be securely stored in other physical devices upon establishment of a two-way trusted relationship, described below.

A federation object 32 is a data structure that has its own unique federation ID 18 and comprises one or more endpoint objects 22: the federation object 32 is established upon secure registration of the first endpoint device 12 and establishment of its corresponding endpoint object 22. As described previously, an individual person (or identified organization) may utilize one or more endpoint devices 12 for network communications; hence, each endpoint object 22 is added to the federation object 32 in response to determining that the corresponding endpoint device (e.g., "A1") 12 has a two-way trusted relationship with a user (or organization) that has previously executed a secure registration with another endpoint device (e.g., "A") 12 in the same federation 32, described below. Hence, the secure private core network 10 can identify an individual person (or identified organization) based on a corresponding federation ID 18 that identifies a collection (i.e., "federation") 34 of one or more endpoint devices 12 having been verified by the secure private core network 10 as each having a secure relationship with the identified person or user.

Hence, a "federation entity" (or simply "federation") 34 as described herein is a logical entity in the secure data network 5, expressed in the secure private core network 10 by its corresponding federation object 32, that uniquely identifies the federation of secured endpoint devices 12 (identified by respective endpoint objects 22) that have a two-way trusted relationship with an individual user or organization. The secure private core network 10 establishes a trusted aggregation of strict two-way trusted relationships between two entities, where each endpoint device 12 of each federation 34 has its own permanent (i.e., unchangeable) and cryptographically-unique endpoint ID 20.

An endpoint device 12 in a federation 34 can generate content as a message object 36 that can be securely stored in one or more endpoint devices 12 in the federation 32. A message object can have different types including messages created within the secure private core network 10 (e.g., a notification object generated by an endpoint device 12 in the secure private core network 10), user created content from a user device 12 (e.g., a text message, an image, a media file, a media stream, etc.), or machine-created content from an IoT device (e.g., a sensor-based data record or media stream, an actuator message, etc.). A message object 36 is identified by a corresponding 256-bit unique message identifier 38 (illustrated in FIG. 2 as "M1" and "M2"): the message ID 38 comprises the federation ID 18 of the federation 34 in which the content was generated, and a corresponding 128-bit message UUID (e.g., "UID1") 40 that is generated by the endpoint device 12 in the federation 34 that generated the content. As described in further detail below, the generation of a message ID 38 that comprises the federation ID 18 provides an ownership reference 84 that establishes an absolute and exclusive ownership right in the content created by the federation 34, such that the content owner of the content in the message object 36 can be identified based on the federation ID 18 in the message ID 38. The message object 36 also can include a corresponding lifecycle policy "L" 24 (identifying for example an expiration date and time that identifies an instance that the associated content is to be automatically deleted from any physical storage device in the secure data network 5), and a corresponding distribution policy "D" 26 (identifying for example a distribution scope such as can only be shared by two users in succession, a distribution start or stop time for granting free access to media content for only one week before or after a concert performance date that is independent of replication of the media content throughout the secure data network 5, etc.). An endpoint device 12 in the federation 34 can distribute content that is stored in a message object 36 based on the endpoint device 12 generating a conversation object 42 comprising a conversation identifier (illustrated as "C1", "C2") 44 that comprises the federation ID 18 and a corresponding 128-bit conversation UUID (e.g., "UID2") 46 that is generated by the endpoint device 12 initiating the distribution of the content (i.e., initiating the "conversation"). The conversation object 42 can be of different types, for example a "post", a "community", a "vault" file system (for secure storage of selected messages at one or more locations). Hence, each conversation object 42 can include a message reference 48 of one or more message objects (e.g., "M1", "M2"); each conversation object 42 also can include a subscriber list 50 specifying at least the federation ID 18 of the federation 34 that created the content in the referenced messages "M1" and "M2" from the message reference 48. A given message (e.g., "M2") can be referenced in more than one conversation object (e.g., "C2"), enabling the message (e.g., "M2") to be replicated to different subscribers (e.g., federation "F2" 34 and federation "F3" 34) specified in the subscriber list 50 according to different policies specified by the corresponding lifecycle policy "L" 24 and the corresponding distribution policy "D" 26 in the conversation object "C2"; hence, the same message object 36 need not be duplicated as separate instances. Hence, a message ID 38 can be distributed according to different policies based on utilizing different conversation objects 42. Additional details regarding managing lifecycles for digital conversations can be found, for example, in U.S. Patent Publication No. 2021/0028940.

The federation object 32 can be implemented as a collection of the endpoint objects 22, message objects 36, and conversation objects that specify the same federation ID 18 as owner of the objects. In other words, the ownership within the same federation 34 is established based on storage of the same federation ID 18: within each endpoint object 22; within the message identifier 38 of each message object 36; and/or within the conversation identifier 44 of each conversation object 42. Hence, the federation object 32 can be implemented based on the federation ID 18 providing a reference to the owned endpoint objects 22, message objects 36, and conversation objects that can be stored at different locations within the memory circuit (94 of FIG. 4) of a physical network device; as a result, the federation object 32 need not be implemented as a discrete data structure that includes the owned objects 22, 36, and 38 stored therein.

Hence, each federation 34 in the secure data network 5 is a collection of one or more secured endpoint devices 12 (identified in the secure private core network 10 by its corresponding endpoint object 22) each of which have a two-way trusted relationship with an individual user or organization: each federation 34 is allocated a corresponding federation object 32 having a corresponding unique federation ID 18 that uniquely identifies the federation 34 in the secure data network 5. The federation object 32 can be stored in a memory circuit (94 of FIG. 4) of any one or more of the endpoint devices (e.g., "A") 12 of the federation "F1" 34.

An endpoint device "A1" 12 can initiate a prescribed secure salutation protocol with another endpoint device "A" 12 in order to establish a two-way trusted relationship between the two endpoint devices "A" and "A1" 12 in the federation "F1" 34, resulting in exchange of public encryption keys for pairwise sharing of encrypted content that cannot be decrypted by any intermediate device (e.g., a replicator device 16 in between two devices 12); hence, the addition of a new endpoint device (e.g., a new smartphone, a new smart tablet or laptop computer, etc. "A1") 12 by a user into the federation "F1" 34 enables the new endpoint device "A1" to execute a prescribed secure salutation protocol with at least one other endpoint device (e.g., endpoint device "A" 12), enabling the newly added endpoint device "A1" 12 in the federation "F1" 34 to establish a two-way trusted relationship with the other endpoint device (e.g., endpoint device "A" 12"). An example salutation protocol is illustrated in U.S. Patent Publication No. 2021/0029126.

The establishment of a two-way trusted relationship between the two endpoint devices 12 within the federation "F1" 34 enable the two endpoint devices 12 to execute autonomic synchronization of any portion of the data structures 22, 36, and 42 between any other endpoint device (e.g., "A1") 12 within the federation "F1" 34.

In particular, each physical network device (including each endpoint device 12) includes an autonomic synchronizer (52 of FIG. 1) that is configured for autonomically (i.e. automatically by a machine) synchronizing data structures between physical network devices that are trusted peer devices, for example between endpoint devices 12 that are identified as subscribers of the same conversation identifier 44 (based on the subscriber list 50): the autonomic synchronizer 52 can autonomically synchronize data structures between any pair of physical network devices having a two-way trusted relationship based on determining any differential hypercontent state (e.g., stored changes) between the stored data objects 22 identified in the message reference 48: the autonomic synchronizer 52 can reconcile any differential hypercontent state between any data objects 22 stored in different endpoint devices 12, resulting in updating the data objects 22 to a most recent version instantaneously in each endpoint device 12 connected to the secure data network 5; any disconnected endpoint device 12 can execute autonomic synchronization upon reconnection to the secure private core network 10, and/or in response to a local P2P (peer to peer) connection with a trusted peer endpoint device 12 (e.g., within its own federation 34 or another federation 34, as appropriate). Endpoint devices 12 within the same federation 34 also can execute autonomic synchronization of all data structures in the federation object 32 (including the federation object 32 itself), according to the policies set in the respective endpoint object 22. Hence, any endpoint device 12 (e.g., endpoint device "A1" 12) that is offline for some time interval can execute autonomic synchronization for updating of its stored content with the other endpoint devices 12 in its federation 34.

The autonomic synchronizer 52 is configured for executing pairwise synchronization between trusted peer devices 12 in response to each update to a data object. In particular, each and every data object that is created and stored in the secure data network 5 comprises a creation timestamp indicating a time that the data object was created, and a "last change" timestamp (i.e., update timestamp) indicating the last time the data object was updated. Hence, the autonomic synchronizer 52 can execute, in cooperation with a corresponding autonomic synchronizer 52 in a trusted peer device, a pairwise update of an older copy of each data object to the most recently available update based on comparing the relative update timestamps.

The autonomic synchronizer 52 of an endpoint device (e.g., "A") 12 utilizes a "database version number" for each other trusted physical network device (e.g., "A1", "R1", "B", "C", "MCP") in which the endpoint device "A" 12 has established a trusted relationship, resulting in a corresponding pairwise relationship in the database version number between trusted peer devices 12. In response to the trusted peer devices 12 connecting to each other (e.g., either directly via a P2P data link or via the secure private core network 10), the autonomic synchronizers 52 in the trusted peer devices 12 can track their respective database version numbers and in response can update their database versions along with the associated database changes.

Since different endpoint devices can be "online" or "offline" at different instances, a "disconnected" endpoint device (e.g., "A1") can develop changes or "versions" that "drift apart" from the synchronized versions among the trusted peer devices that are connected to the secure private core network 10, for example where a federation owner is updating a message object (e.g., a note or memorandum) 36 using the "disconnected" endpoint device (e.g., "A1"). Hence, the autonomic synchronizer 52 of an endpoint device (e.g., "B") 12 can respond to reconnection with the secure private core network 10 (or a trusted peer device 12 via a P2P data link) by comparing its "database version number" (e.g., the database version number associated with its peer "A") and determine if synchronization is needed.

The autonomic synchronizer 52 also can track changes of all locally-stored data objects based on creating a hash of a database state: the database state represents all locally-stored data objects as tuples of a data object identifier and the "last changed" timestamp. Example locally-stored data objects that can be generated by a federation owner on an endpoint device 12, and replicated and synchronized with other endpoint devices 12, can include: endpoint objects 22; conversation objects 42; message objects 36; outcasted endpoints, conversations and messages that are removed from a federation 34; membership of federations in conversations (e.g., subscriber lists 50); cohorts within a federation; voting state for conversations and messages; a vault file system within a federation; password recovery information for participants in password recovery; "shared" configuration between devices within a federation; etc.

Hence, any one or more of the endpoint devices 12 of a first federation (e.g., "F1") 34 can cause the secure private core network 10 to execute autonomic synchronization of any portion of the data structures 22, 36, and 42 in any other federation (e.g., "F2" or "F3") 34 in which the first federation has established a two-way trusted relationship, based on the subscriber list 50 in a given conversation object 42: the autonomic synchronization is executed in a secure manner that ensures that all data structures always stored securely in a non-transitory machine readable medium, and that all data structures are always transmitted securely, for example via a wireless (or wired) transmission medium.

For example, any data object (e.g., 22, 36, and/or 42) that is generated and stored within an endpoint device 12 (e.g., "A") can be encrypted using its public key (e.g., "KeyP1_A"); any data object that is sent from an originating endpoint device 12 (e.g., "A") to a cohort (e.g., "B") (either within its federation "F1" 34 or in another federation "F2" 34) for secure storage can be encrypted using the originator private key (e.g., "prvKeyP1_A") and the cohort public key (e.g., "Key_B"), and further encrypted using a temporal key prior to transmission to the cohort. The cohort can decrypt the transmitted data object based on the temporal key (described below) and store the object that was encrypted using the originator private key (e.g., "prvKeyP1_A") and the cohort public key (e.g., "Key_B").

As described below, the verified secure relationship is established via a "two-way trusted relationship" that is verified by the MCP device 14 via the first party (e.g., an individual person, organization, or another physical device) and via the second party (e.g., via the physical network device); in other words, no third-party authentication (e.g., by a certifying authority outside the authority of the secure private core network 10) is permitted in the secure private core network 10, nor is any one-way verification permitted in the secure private core network 10; hence, the trusted aggregation of multiple two-way trusted relationships establishes the hybrid peer-to-peer overlay network in the secure private core network 10.

Figure 3:
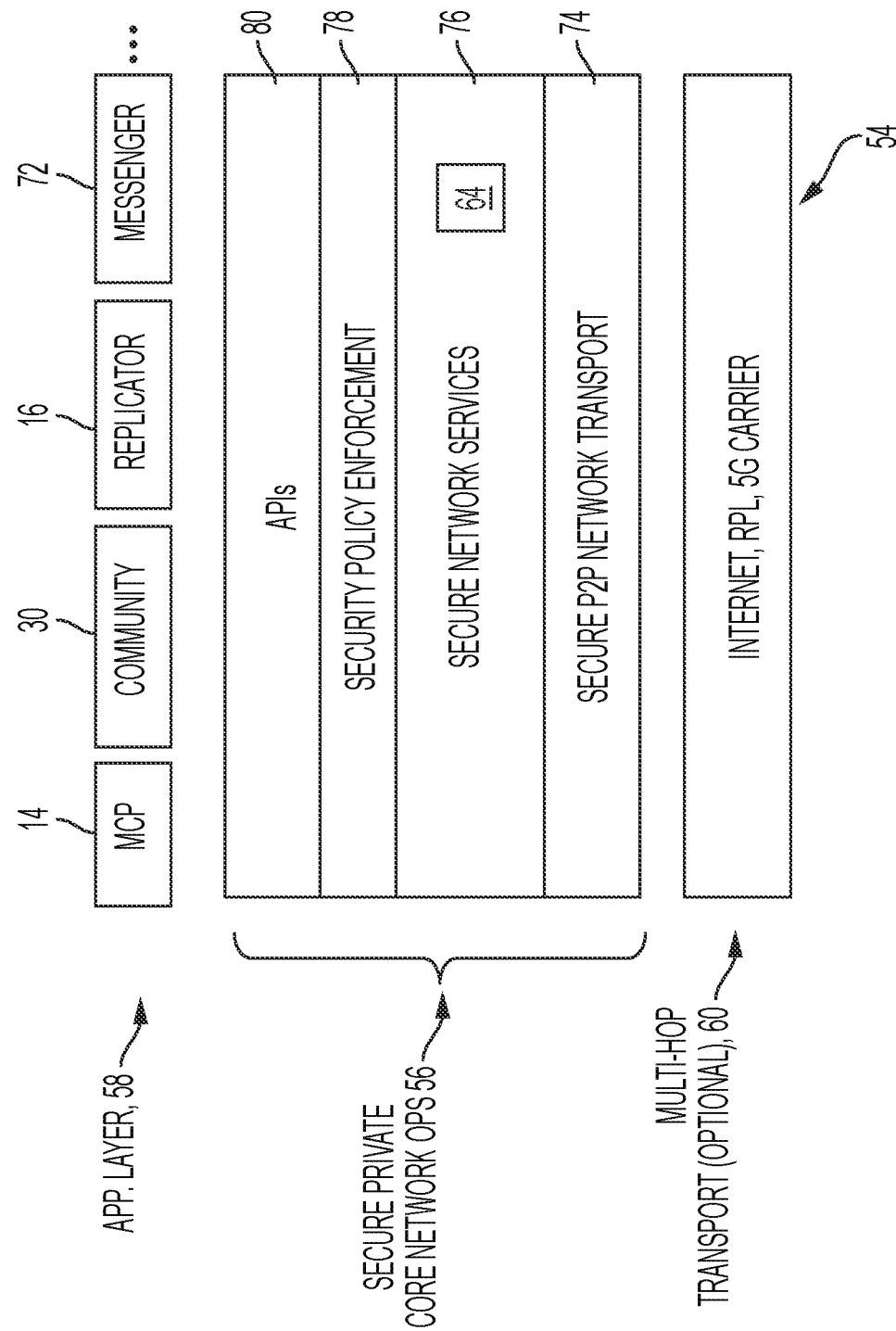
FIG. 3 illustrates an example implementation in an apparatus of executable code configured for providing operations for deployment of the secure peer-to-peer data network, according to an example embodiment.

FIG. 3 illustrates an example implementation 54 in a physical network device (e.g., an endpoint device 12) for deployment of the secure data network 5 in a physical data network, according to an example embodiment. The example implementation 54 includes execution of secure private core network operations 56, and execution of selected application layer resources 58 for formation of the secure data network 5. For example, the application layer resources 58 can include executable application code that causes a physical network device to selectively execute element-specific operations within the secure private core network 10, for example an MCP device 14, a replicator device 16, a community server 30; as shown in FIG. 1, additional application layer resources 58 that can be deployed in the secure private core network 10 by a physical network device (e.g., an endpoint device 12) can include a directory server 28 (hosted in the same network executing the MCP device 14), a community server 30 (hosted in the same physical network device executing the MCP device 14), and a load balancer 62 for allocating each endpoint device 12 to a replicator device 16. The application layer resources 58 also can include a messenger application 72 that enables a user of an endpoint device 12 (e.g., a 5G smart phone) to send and receive content using conversation objects 42, for example in the form of instant messages, public/private forum posts, etc. An example of the messenger application 72 is the commercially available application "Society" from WhiteStar Communications, Inc., Durham, North Carolina, at the website address "https://societyapp.io/".

The secure private core network operations 56 can be executed by each of the physical network devices in the secure data network 5 (including each of the endpoint devices 12) executing machine-executable code that can be implemented in each physical network device in the form of a self-contained "network operating system" (NOS) 56. The "network operating system" 56 can be implemented for deployment on various network device platforms, for example as a native operating system (e.g., for an IoT device or a physical network device dedicated for use in the secure data network 5), or as an executable "app" that can be installed and executed on a device utilizing an operating system such as Android, iOS, Microsoft Windows 10, or any other Unix-based operating system.

The network operating system 56 can include machine-executable code for executing numerous security-based operations in the secure data network 5, including establishment of a secure peer-to-peer (P2P) network transport 74 based on a dynamic generation of a unique encrypted temporal key for each and every data packet that traverses the secure data network 5, providing secure network services 76, providing security policy enforcement 78, and providing application programming interfaces (APIs) 80.

Figure 9:
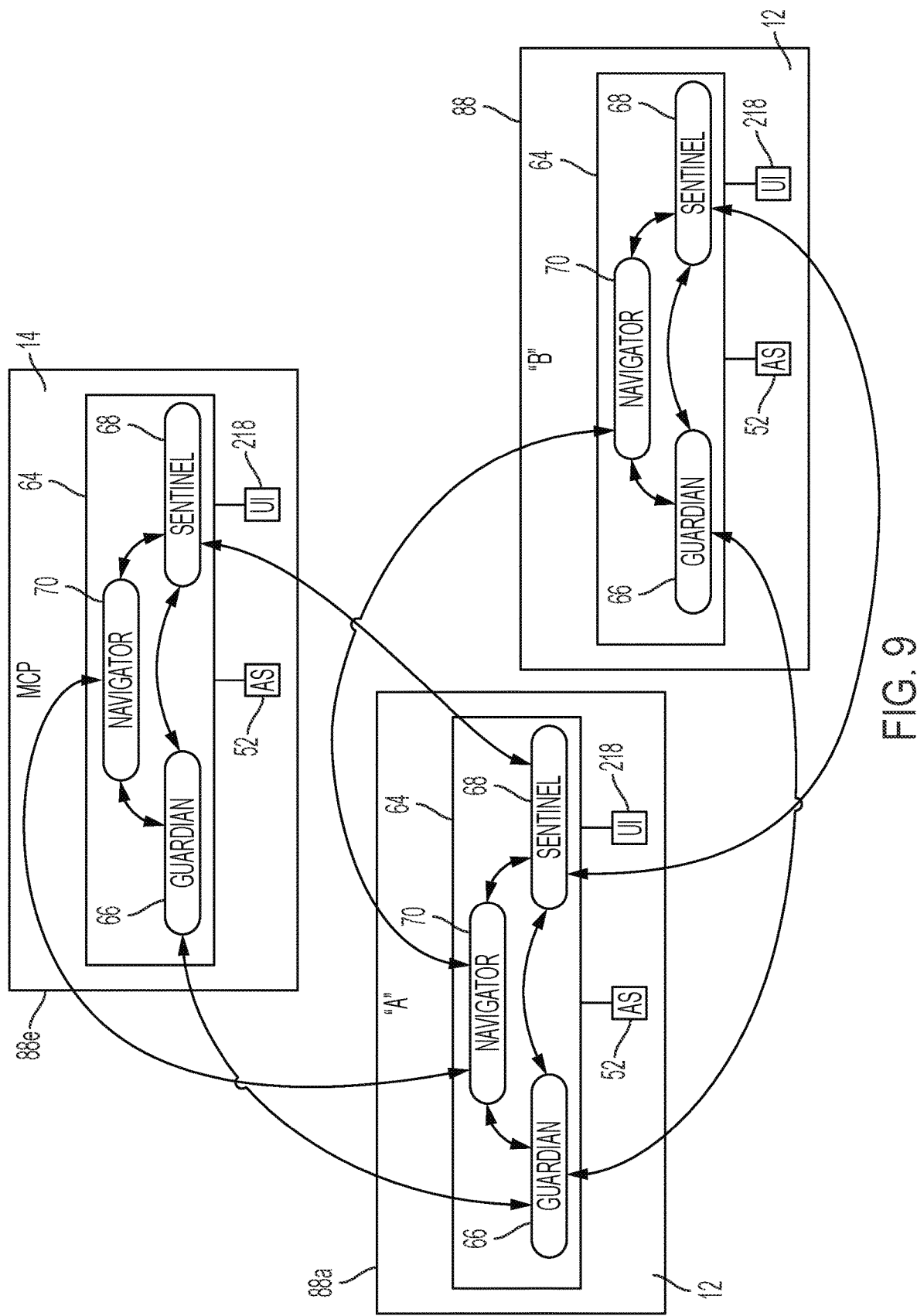
FIG. 9 illustrates in further detail the distributed artificial intelligence (AI) based security suite of real-time protection, real-time threat detection, and real-time secure connection management, according to an example embodiment.

Example secure network services 76, illustrated in FIGS. 1, 3, and 9, can include machine-executable code for executing an Artificial Intelligence (AI) based security service 64 that comprises a guardian service 66, a sentinel service 68, and a navigator service 70. Additional example secure network services 76 can include machine-executable code for executing a prescribed secure salutation protocol with another physical network device (e.g., another endpoint device 12) for establishment of a secure two-way trusted relationship, executing management of messages or conversations (e.g., according to a lifecycle policy "L" 24 and/or a distribution policy "D" 26), executing management of secure and permanent deletion of data objects or an endpoint device 12 from the secure data network 5 ("zeroization"), account management, etc. Another example secure network service 76, illustrated in FIG. 1, includes machine-executable code for executing a distributed search (DS) agent 82: the distributed search (DS) agent 82 can execute AI analytics and generate metadata for AI operations; the distributed search (DS) agent 82 is configured for generation and selected synchronization of "projections" with other distributed search (DS) agents 82 that enable real-time searches to be executed by any endpoint device 12, an MCP device 14, any replicator device 16, a directory server 28 or community server 30, and/or any of the components or executable agents of the AI-based security service 64.

The APIs provide prescribed commands that are available to the application layer resources 58 for execution of the secure private core network operations 56; moreover, the APIs 58 separate application logic from the need for any domain knowledge of the underlying data network that is implementing the secure data network 5. Hence, the example implementation 54 enables application developers to create the application layer resources 58 without any need of domain knowledge, and without any need to learn any security-based protocols, since the secure private core network operations 56 can ensure that the secure data network 5 provides a secure network that can prevent network intrusion.

As illustrated in FIG. 3, the example implementation 54 also can optionally include a multi-hop transport layer 60 that enables the secure data network 5 to be deployed overlying an existing network infrastructure, for example the Internet or another multi-hop data network (96 of FIG. 6), for example a private network provided by a wireless 5G service provider (e.g., Verizon, AT&T, etc.), or a private network constructed according to an alternative multi-hop protocol such as the Routing Protocol for Low Power and Lossy Networks (RPL) according to the Internet Engineering Task Force (IETF) Request for Comments (RFC) 6550. Hence, the secure data network 5 can be deployed as a private network (e.g., by a 5G service provider or a RPL-based network) for use by private subscribers, without any data traffic exposed to the Internet. The secure data network 5 also can be deployed, however, from the "ground up" based on an aggregation of multiple trusted P2P connections using the secure P2P network transport 74 across multiple physical network devices establishing a mesh of peer to peer connections via the pairwise topology 98 of replicator devices 16, resulting in the potential deployment of a worldwide deployment of a secure data network 5, without the Internet.

The security policy enforcement 78 provides an enforcement of application-level and user level "manners and semantics" that ensures compliance with digital rights and user relationship rights in the secure private core network 10. In one example, if an errant application (or user) attempted to modify content it did not have rights to (e.g., a user in the federation "F2" 34 attempted to modify content in a message ID 38 generated by the user of the federation "F1" 34 as identified by the federation ID "F1" 18 in the message ID 38), the security policy enforcement 78 can block the attempt to modify the content. As apparent from this example, the security policy enforcement 78 can prevent unauthorized manipulation of media content that has resulted in a proliferation of "deep fake" videos.

The security policy enforcement 78 also provides an enforcement of user digital rights, where at any time a user in the federation "F1" 34 can amend or delete instantaneously any one content item owned by the user (i.e., that includes the corresponding federation ID "F1" as part of its message ID 38): the security policy enforcement 78 can cause all autonomic synchronizers 52 that have a cohort relationship with the federation "F1" to instantly amend or delete the content item identified by its message ID 38.

The security policy enforcement 78 also can enforce various trust levels between an identified cohort, for example a progression from a transient trust (based on location proximity or common interests) to a permanent trust relationship; the security policy enforcement 78 also can enforce a revoked trust ("outcasting"), where the security policy enforcement 78 can respond to a user of the federation "F1" 34 wishing to revoke a relationship with the user of the federation "F2" 34; in this case, the security policy enforcement 78 can provide various warnings regarding revoking a relationship ("outcasting"), including loss of shared data, loss of shared contacts, etc.; as such, the security policy enforcement 78 can encourage dispute resolution between two parties to encourage that societal contracts are fulfilled.

The security policy enforcement 78 also can enforce proper semantic behaviors in the secure private core network 10, including ensuring API calls (by the APIs 80) are presented in the appropriate sequence (i.e., not out-of-order), and that a user of a federation 34 performs social-based operations in the secure private core network 10 in the appropriate order, e.g., a user cannot "join" a conversation without having been invited to join the conversation, and a user cannot "leave" a conversation without first being joined as a member, etc.

Hence, the example implementation 54 can ensure reliable establishment of cohorts, and can enforce security policies that ensure preservation of media rights and maintaining mutual trust between users via their federations 34.

A fundamental problem in the Internet is that prior to deployment of Dynamic Host Configuration Protocol (DHCP), IP addresses at first were allocated (in prescribed address ranges or "blocks") to organizations, and specific IP addresses could be fixed to a specific location (e.g., an office); hence, an Internet Protocol (IP) address had been used to identify a business, a business location (e.g., office location), a person (e.g., an individual utilizing an office having a network connection), and/or a physical network device (e.g., a personal computer operated by the person within the office and utilizing the network connection). However, the use of DHCP, NAT/PAT, wireless access on a guest network, etc., demonstrates than an IP address does not, in fact, accurately represent any one of a business, a location, a person, or a physical network device.

Another fundamental problem in the Internet is that it is built from its Border Gateway Protocol (BGP) core outward to BGP peers that operate as respective Autonomous Systems (ASs), to establish a BGP mesh network, each AS subdividing out from there toward a network edge; hence, a network is not considered "converged" until any one IP address (source address) can route a data packet to any other destination IP address. In addition to causing scaling problems as more networks and more devices are added to the Internet, this universal reachability from any source IP address to any destination IP address also introduces severe security threats since any "threat device" originating at a "source" IP address can threaten any "target device" at a "destination" IP address. In other words, anyone can obtain unrestricted access to the Internet via a threat device using a "source" IP address, and target devices at destination IP addresses need to expend significant resources to prevent intrusion by the threat device.

These security threats are magnified by orders of magnitude by cloud computing services using data centers worldwide for replication of data for cloud-based services: a successful attack on any one of the millions of IP addresses in use by a cloud computing service has the potential to disrupt the entire worldwide cloud computing service for millions of customers of the cloud computing service. Attempts to implement a "zero trust network" (e.g., at a utility company, a gas pipeline company, etc.) in order to avoid a cyber-attack are ultimately ineffective because a "threat device" still has Internet-based access to numerous entry points within the "zero trust network", which can be in the range of millions of IP addresses that the zero trust network relies on for cloud-based services: in other words, a zero trust network utilizing cloud-based services can have an attack surface area of over one million IP address.

The secure private core network 10 is implemented with the following security features and operations: the secure private core network 10 can provide full privacy for each endpoint device 12; the secure private core network 10 can ensure free association of users or their associated endpoint devices 12 (i.e., no third party can force a disassociation or disconnection between two associated users that have formed an association between each other); the secure private core network 10 can enable the protection of ownership of all content by users (i.e., user content cannot be "stolen" by another user); and the secure private core network 10 can eliminate the necessity for centralized services, controls, costs, such as found in a cloud-based computing system. The secure private core network 10 also can prevent unauthorized monetization of users' data, and also can facilitate integrated money exchange.

The secure private core network 10 is implemented as a hybrid peer-to-peer overlay network that does not contain any centralized controls as found in a cloud-based computing system; to the contrary, the secure private core network 10 can be composed based on aggregating a large number of small, decentralized, networks that are built by endpoint devices 12 at the "edge" of the network. Moreover, the secure private core network 10 can inherently implement security as a core policy (i.e., a "base tenant" of the secure private core network 10), where each decentralized network has a limited number of network nodes, and every user must "opt-in" before communicating with another network node.

Hence, the secure private core network 10 can initiate a two-device secure data network 5 between two endpoint devices 12 (e.g., between two individuals sharing data between two smart phones via a P2P link), and can aggregate additional devices 12 for eventual formation of a worldwide secure data network.

The secure private core network 10 comprises a single MCP device 14 that is implemented by a physical network device (e.g., an endpoint device 12) such as a user device, or a high-end computing device (e.g., a server device owned by a private network provider such as a 5G service provider, etc.) executing the executable application resource "MCP" 58 illustrated in FIG. 3; in other words, the MCP device 14 can be deployed as an executable application layer resource 58 that can be executed on any physical network device. In one example, a user device (e.g., a 5G smart phone) can initiate execution of the application resource "MCP" 58 (overlying the 5G smart phone execution of the secure private core network operations 56 as a "network operating system" app) for establishment of the secure data network 5 as a private peer-to-peer network in an isolated region that has a limited number of users (e.g., around twenty users in an isolated region that has no connection to a 5G service provider network or wide area network).

The MCP device 14 operates as a prescribed management agent in the secure peer-to-peer data network 5. Hence, only one MCP device 14 is executed in the secure data network 5 at a given time, even though an isolated secure data network 5 can have its own MCP device 14: hence, a physical network device must halt execution of its MCP device 14 prior to joining another secure data network 5 (e.g., executing a merge operation with a larger, pre-existing secure private core network 10 hosted by a 5G service provider). The MCP device 14 can manage subscriptions and registrations by individuals or businesses to the secure data network 5, accounting, load balancing (executed by the load balancer 62), endpoint-replicator assignment (including tracking endpoint—replicator connections for replicator queries), and software update compatibility enforcement. The MCP device 14 also can coordinate with AI-based assist operations provided for example by the AI-based security service 64 (e.g., connection assist using the navigator service 70, salutation assist, conversation assist using the community server 30, revocation assist, zeroization assist, etc.).

The MCP device 14 is connected to each and every replicator device 16, and can maintain a mapping of every endpoint device 12 to a state (either offline or connected to an identified replicator device 16).

The replicator device 16 can be deployed as an executable application layer resource 58 that can be executed on any physical network device. Each replicator device 16 can establish a secure two-way trusted relationship with the MCP device 14 using a prescribed secure salutation protocol that includes negotiation of a public key pair; each replicator device 16 also can establish a secure two-way trusted relationship with all other available replicator devices 16 (using a prescribed secure salutation protocol that includes negotiation of a public key pair) to form a pairwise topology 98 (i.e., one logical hop between each replicator); each replicator device 16 can provide connections between endpoint devices 12 using various secure network transport operations, including crypto-signed switching described below. Hence, each endpoint device 12 can be connected to another endpoint device by zero logical hops (pure peer-to-peer (P2P) connection "A-A1" in FIG. 1), one logical hybrid P2P hop (e.g., "B-R100-C"), or two-logical hybrid P2P hops (e.g., "A-R1-R100-B"). Each logical connection is based on a first party trusted relationship established by a replicator (e.g., replicator device "R1" 16) and its peer replicator (e.g., replicator device "R100" 16). Replicator devices 16 each include a flow table (forwarding information base) for forwarding received packets after packet authentication.

The directory server 28 can be executed by MCP device 14. The directory server 28 is configured for managing ontologies of data structures (e.g., caching intermediate results), storing tags, federation IDs etc. (for projections, e.g., parallel searches by the distributed search (DS) agent 82 of one or more physical network devices such as endpoint devices 12).

The community server 30 can be executed by the MCP device 14 and/or any endpoint device 12; the community server 30 is configured for hosting posts within a public and/or private community in the secure private core network 10.

The guardian service 66 can be executed as part of the secure network services 76 and can manage protection of data during transmission or reception ("in-flight") and while stored on a machine-readable non-transitory storage medium ("at rest"), including maintaining persistence of endpoint objects 22, conversation objects 42, and message objects 36 according to the associated lifecycle policy "L" 24 and distribution policy "D" 26.

The navigator service 70 can be executed as part of the secure network services 76 and can manage connectivity graphs for how to connect cohorts; the navigator service 70 also can warn the sentinel service 68 of detected threats, and the navigator service 70 can respond to threats detected by the sentinel service 68.

The sentinel service 68 can be executed as part of the secure network services 76 and can detect threats in real time, mitigate against detected threats (e.g., warning user, automatic mitigation operations, etc., notifying the navigator service 70), etc.

The guardian service (i.e., guardian security agent) 66, sentinel service (i.e., sentinel security agent) 68, and navigator service (i.e., navigator security agent) 70 executed as part of the AI-based security service 64 in the secure network services 76 are scalable in that every physical network device can execute the various services 66, 68, and 70 at a scale corresponding to the associated application operations 58 of the physical device executing the associated application layer resources 58; hence, executable agents 66, 68, and 70 operating in one endpoint device (e.g., "A" 12) can securely communicate and share metadata (e.g., feature data such as cyber-attack feature data, wireless network feature data, etc.) with agents operating in other physical network devices (e.g., "R1", "R100", the MCP device 14, endpoint device "B" 12) to localize and identify potential threats and prevent any attacks within the secure private core network 10. Hence, the AI-based security service 64 can manage user metadata in order to enhance user security, as opposed to monitoring user metadata for monetizing.

The distributed search (DS) agent 82 can execute projections: in relational algebra a projection refers to a subset of columns of information; hence, a distributed search (DS) agent 82 can apply a subset of information from a data structure (e.g., a federation ID 18, endpoint ID 20, message ID 38, conversation identifier 44, endpoint object 22, message object 36, conversation object 42 or a hypercontent component thereof), to decompose a mapping of a database lookup into a set of queries and subqueries; the generation of a projection enables execution of parallel distributed searches. A projection can be created by a distributed search (DS) agent 82 executed by any physical network device within the secure data network 5. A projection generated by a distributed search (DS) agent 82 can have a defined scope (or "extent"), for example, local, within a federation 34, within a conversation, global, etc.; a projection also can have different types (e.g., one-time, until a deadline, etc.), and can be named with arbitrary names (e.g., contact lookup, signet scan, etc.). Each projection defines an arbitrary number of "projection entries" that are used to match fields using various search techniques, and to select which fields associated with the matches should be returned; the fields can be arbitrary types of information in the secure data network 5 (e.g., signet, endpoint ID 20, email address, tag, message ID 38, conversation identifier 44, titles, names, hypercontent, URLs, etc.), and the values for matches can be exact matches or regular expressions ("regex") comprising a sequence of characters that have a matching pattern. Each projection entry can select a number of fields that should be returned when matches select information: if no matches are found for a projection entry then no record is returned; for matches, values for the fields selected are returned along with the associated projection entry tag.

Hence, a distributed search (DS) agent 82 can execute a projection that has a scope that limits the extent of a search: the scope can be limited at different locations: for example a scope can limit a search by an endpoint device 12 to a common word usage, old passwords, etc.; a scope can limit a search by a replicator device 16 to GIF image searches, for example; a scope can limit a search by the MCP device 14 to limited fields to preserve privacy of users of the endpoint devices 12, for example limiting searches to a hash of a user email (and not the actual email which is not made available to the MCP device 14), federation ID 18, endpoint ID 20; a scope also can limit a search by the directory server 28 and/or the community server 30. Projections can be executed once, continuously, periodically, until a prescribed "event" deadline (e.g., time expiration, project deadline reached, etc.).

A distributed search (DS) agent 82 also can obtain metadata from other agents executed in the secure private core network 10 to extract feature graphs for assistance in AI-based decisions such as recommendations whether to accept connection requests or conversation requests, keyboard word suggestions, etc.

Hence, the implementation of the secure private core network 10 as a cloudless hybrid peer-to-peer overlay network enables every person and every device to be securely connected, and as such is a realization of "Metcalf's Law" that the value of a telecommunications network is proportional to the square of the number of connected users of the system. The implementation of the secure private core network 10 as a cloudless hybrid peer-to-peer overlay network can extend security features and security operations that mimic social networks without technical constraints, and the use of AI enables the secure private core network 10 to fit policy and interaction requirements of individual users (i.e., people), as opposed to requiring people to adapt to technical constraints.

Hence, the aggregation of two-way trusted relationships in the secure private core network 10 ensures that any attack surface area within the secure data network 5 is limited to two devices at any time, requiring any "threat device" to successfully hack the secure keys of the two peer devices before being able to compromise only the pairwise-encrypted content shared only between the two peer devices; hence, any further attack would require the threat device to successfully hack a next pair of secure keys, etc.

The secure private core network 10 also can include a sensor network comprising one or more sensor devices (e.g., Internet of Things-based sensor devices): each sensor device has a trusted relationship with at least another sensor device, or a trusted relationship with another entity that enables the sensor device to associate with a single individual, a PAN, a room area network, etc.

Depending on implementation, the secure data network 5 can be established as an aggregation of decentralized secure networks. Each decentralized network can be connected to another decentralized network by one or more private dedicated optical fiber connections ("dark fiber pairs") that are part of a private backbone network: the private backbone network can utilize one or more optical network carriers on diverse fiber paths in order to provide a regionally redundant connectivity over large geographic areas (e.g., providing connectivity between eastern United States, southwest United States, Midwest United States, etc.). Sub-oceanic fiber paths and/or satellite communications also can be used to extend the private backbone network in one geographic region to a worldwide private backbone network. The private backbone network also can be managed by a "bare metal infrastructure" where any server devices executing any network-based operations are single-tenant server devices, i.e., the server devices are reserved for the exclusive use of the private backbone network only, with no use by a third-party tenant permitted (as opposed to existing cloud computing systems that can "share tenants" on a single network device). Further, all data in the private backbone network is always encrypted by default, regardless of whether the data is stored on a non-transitory machine-readable storage medium (i.e., "at rest"), or whether the data is undergoing wired or wireless transmission (i.e., "in transit").

Hardware Device Overview

Figure 4:
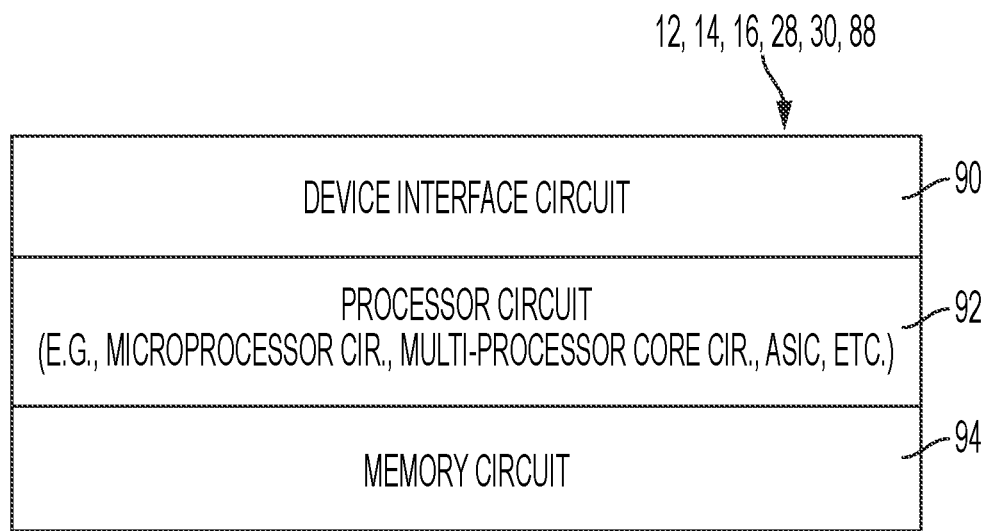
FIG. 4 illustrates an example implementation of any of the network devices described with reference to any of the Figures, according to an example embodiment.

FIG. 4 illustrates an example implementation of any one of the physical network devices shown in any of the other Figures (e.g., 12, 14, 16, 28, 30, and or 88 of FIGS. 1, 2, and/or 6), according to an example embodiment.

Each apparatus (e.g., 12, 14, 16, 28, 30, and or 88 of FIGS. 1, 2, and/or 6) can include a device interface circuit 90, a processor circuit 92, and a memory circuit 94. The device interface circuit 90 can include one or more distinct physical layer transceivers for communication with any one of the other devices (e.g., 12, 14, 16, 28, 30, and or 88); the device interface circuit 90 also can include an IEEE based Ethernet transceiver for communications with the devices of FIG. 1 via any type of data link (e.g., a wired or wireless link, an optical link, etc.). The processor circuit 92 can be configured for executing any of the operations described herein, and the memory circuit 94 can be configured for storing any data or data packets as described herein.

Any of the disclosed circuits of the devices (e.g., 12, 14, 16, 28, 30, and or 88) (including the device interface circuit 90, the processor circuit 92, the memory circuit 94, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 94) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 94 can be implemented, for example, using a non-volatile memory such as a programmable read only memory (PROM) or an EPROM, and/or a volatile memory such as a DRAM, etc..

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 94 can be implemented dynamically by the processor circuit 92, for example based on memory address assignment and partitioning executed by the processor circuit 92.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Identity Management System Forming Two-Way Trusted Relationships

The example embodiments enable the secure establishment of universally-unique identities in a secure peer-to-peer data network 5 that is established based on an aggregation of two-way trusted relationships, all under the control of the AI based security suite 64. The secure establishment of universally-unique identities is based on establishing a unique federation identifier for a "requesting party" (e.g., user, business entity, etc.) once a two-way trusted relationship has been established between the requesting party and the secure peer-to-peer data network, and establishing a permanent and unique endpoint identifier for a network device used by the requesting party for joining the secure peer-to-peer data network. The endpoint identifier is associated with the federation identifier to establish that the requesting party has ownership of the corresponding network device, where the "ownership" establishes a two-way trusted relationship between the requesting party and the corresponding network device based on the requesting party retaining possession and control of the network device; hence, the endpoint identifier (associated with the federation identifier) can uniquely identify the network device in the secure peer-to-peer data network as an "endpoint device" that is associated with the requesting party based on a two-way trusted relationship between the requesting party and the endpoint device.

The requesting party can add additional network devices as distinct endpoint devices that are associated with the federation identifier based on a corresponding two-way trusted relationship between the requesting party and the corresponding network device, under the control of the AI based security suite. Hence, a requesting user can aggregate a "federation" of trusted endpoint devices for use within the secure peer-to-peer data network.

Moreover, each endpoint device can uniquely and securely identify itself based on the AI based security suite cryptographically generating a secure private key and a corresponding secure public key associated with the requesting party utilizing the endpoint device. Hence, data storage in each and every network device in the secure peer-to-peer data network, as well as all network communications between each and every network device, can be secured by the guardian security agent based on sharing secure public keys between endpoint devices having established a two-way trusted relationship based on a secure verification of membership within the same "federation" according to a prescribed secure salutation protocol under the control of the AI based security suite.

The following description summarizes the establishment of the secure peer-to-peer data network 5 as a trusted aggregation of two-way first-party trusted relationships, also referred to as "cohorts". Each two-way first-party trusted relationship requires a requesting party "X" to send a relationship request directly to a recipient party "Y" (the first "way" of the two-way first-party trusted relationship), i.e., no "requesting agent" can act on behalf of the requesting party "X" without explicit authorization from the requesting party "X" to send the request; similarly, no "receiving agent" can act on behalf of a recipient party "Y" without explicit authorization from the recipient party "Y". The relationship request can include a secure public key "Key_X" associated with the requesting party "X" (i.e., the requesting party "X" owns a private key "prvKey_X" corresponding to the secure public key "Key_X"), as opposed to relying on any trust in a secure certificate issued by a third party certifying authority. The recipient party "Y" can decide to accept the request or deny the request; if the recipient party "Y" decides to accept the relationship request, the recipient party "Y" can store the secure public key "Key_X" and send to the requesting party "X" an acknowledgment that contains the secure public key "Key_Y" of the recipient party "Y" (i.e., the recipient party "Y" owns a private key "prvKey_Y" corresponding to the secure public key "Key_Y"). The acknowledgment can be encrypted using a temporal key generated by the recipient party "Y": the recipient party can encrypt the temporal key using the secure public key "Key_X", and add to the encrypted acknowledgment (containing the secure public key "Key_Y") the encrypted temporal key. Encryption can be executed, for example, using data encryption standard (DES), TripleDES, RSA, Advanced Encryption Standard (AES), ECIES, etc.

Hence, the requesting party "X", in response to receiving the encrypted acknowledgment containing the encrypted temporal key, can recover the temporal key based on decryption using the corresponding private key "prvKey_X", and decrypt the encrypted acknowledgment using the recovered temporal key to obtain the secure public key "Key_Y". Hence, the two-way first-party trusted relationship between the parties "X" and "Y", or "cohort" between "X" and "Y", can be securely maintained based on the secure storage of data ("at rest") using the key pairs "Key_X" and "Key_Y"; secure communications between the endpoint devices 12 associated with the cohort "X" and "Y" also can be secured based on encrypting each data packet prior to transmission using a temporal key, where the temporal key also is encrypted (using the key of the destination device) to form an encrypted temporal key that is supplied with the encrypted data packet for decryption at the destination.

The aggregation of cohorts between two endpoint devices 12 (pairs of pairs of pairs) ensures that the attack surface area in the secure data network 5 is no more than two ("2") devices, regardless of the size of the secure data network 5. Use of encrypted temporal keys ensures that every transmitted data packet has a different key needed for decryption following transmission. Every data structure stored in the secure data network 5 has a different encryption with a different key, such that the "prize" for hacking a stored data file is only the one hacked data file.

Figure 5A:
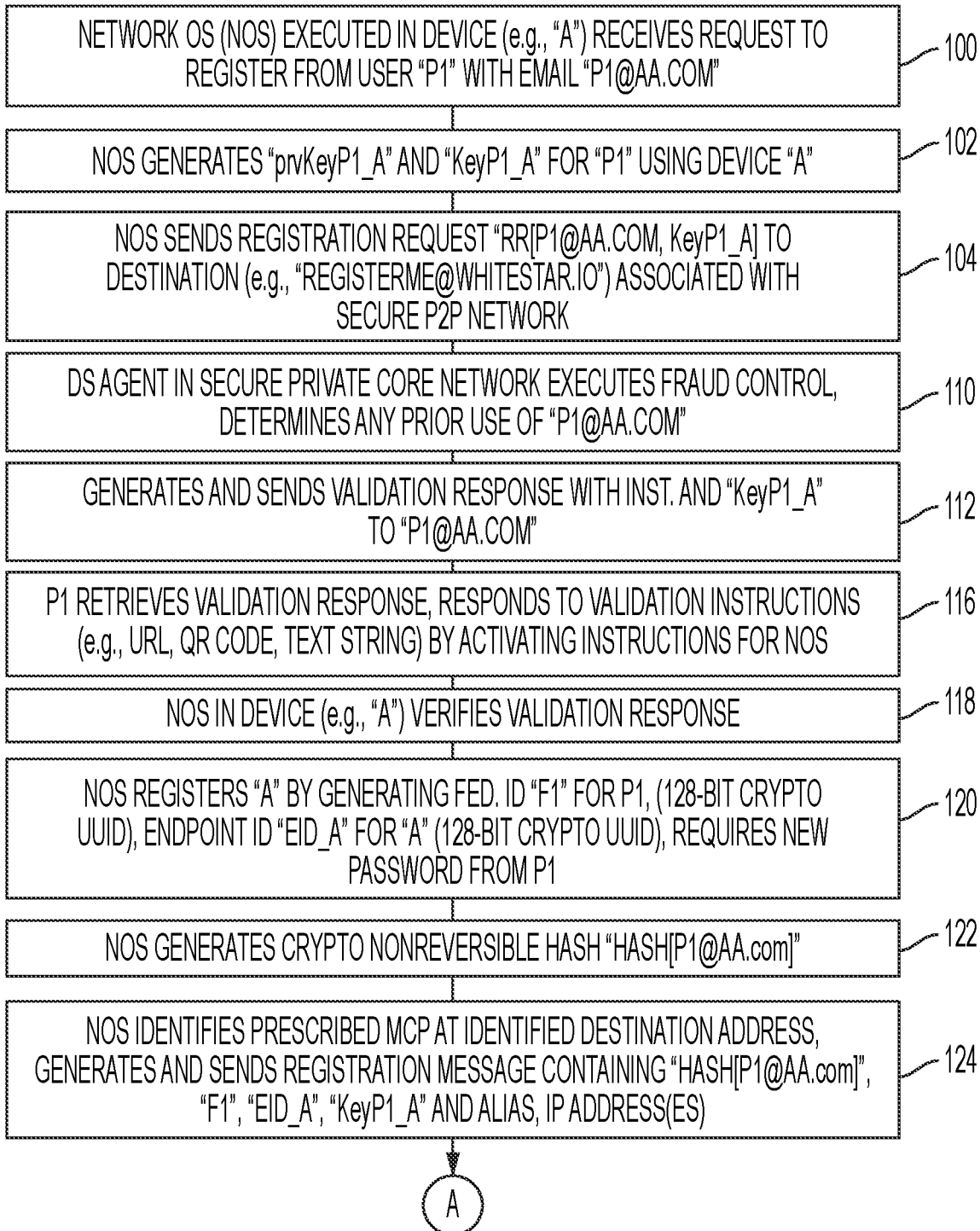
FIGS. 5A and 5B illustrate an example method of executing an identity management system for registering a requesting user based on establishment of a two-way trusted relationship, including creating a federation identifier in the secure peer-to-peer data network for the requesting user, according to an example embodiment.
Figure 5B:
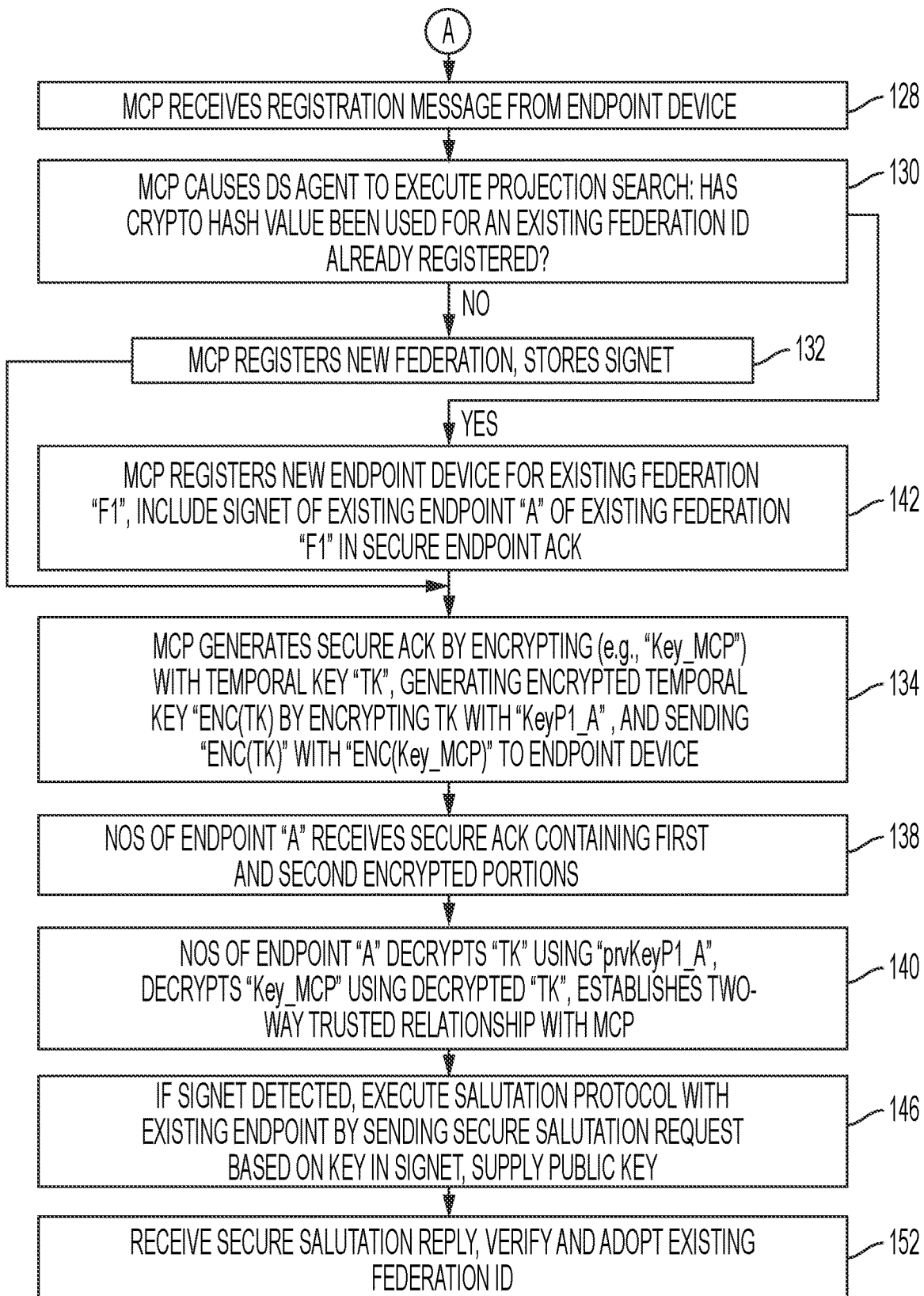
Figure 6:
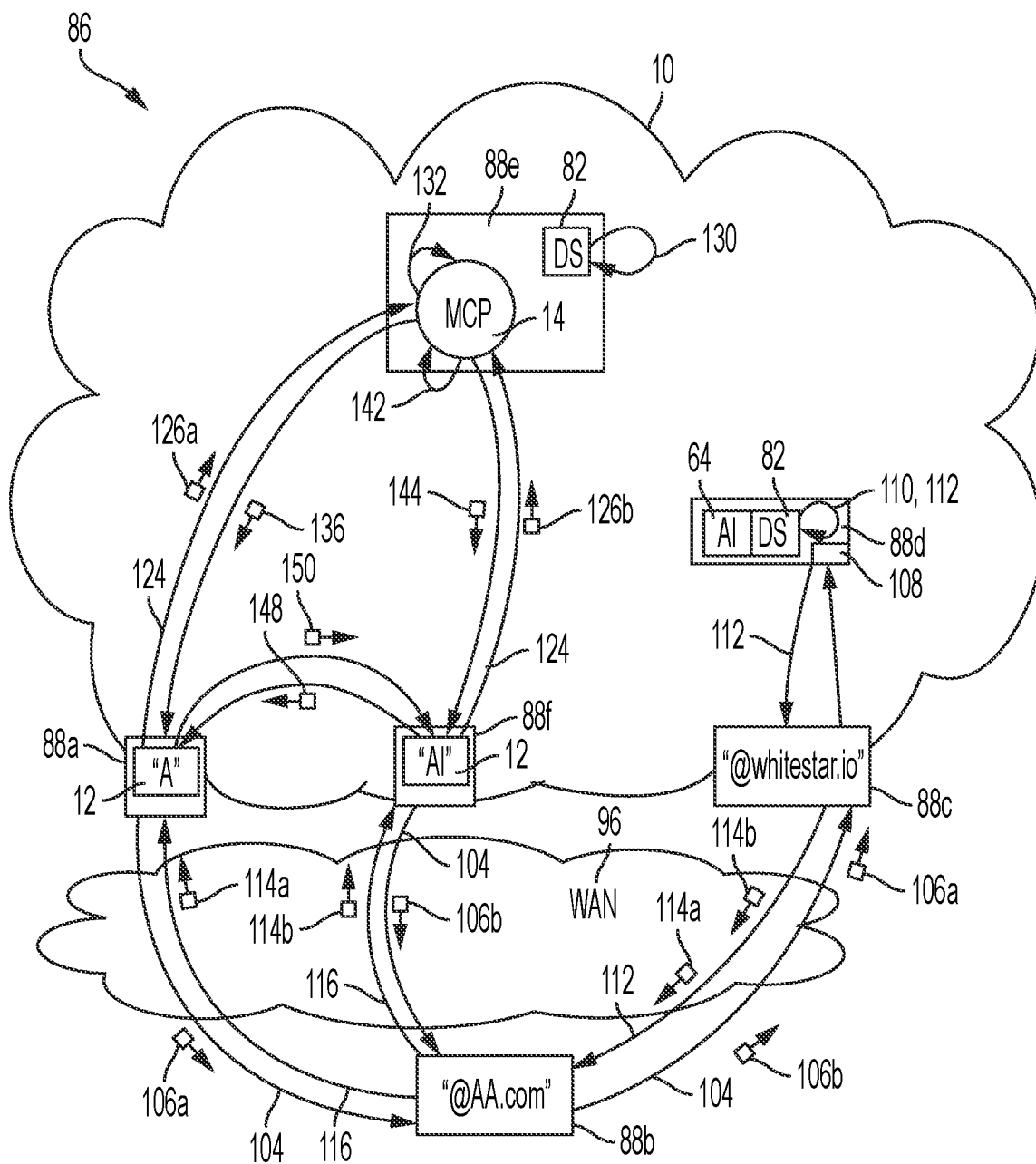
FIG. 6 illustrates in further detail interactions between user-controlled network devices, server network devices in an external data network, and one or more server network devices in the secure peer-to-peer data network, in establishing a two-way trusted relationship for creation of a federation identifier in the secure peer-to-peer data network for the requesting user and an endpoint identifier associated with the federation identifier for each endpoint device of the requesting user, according to an example embodiment.

FIGS. 5A, 5B and 6 illustrate an example identity management system 86 that can be implemented in the secure private core network 10 for secure establishment of trusted relationships in the secure data network 5, according to an example embodiment. A new subscriber "P1" can operate his or her physical network device (88a of FIG. 6) to cause the processor circuit 92 of the physical network device 88a to download and install, for example via an external data network 96 distinct from the secure peer-to-peer data network 5, an executable application (e.g., an "app") that includes a desired application (e.g., a messenger application 72 of FIG. 3) and the network operating system (NOS) 56. The new subscriber "P1" as a "requesting party" can enter via the device interface circuit 90 of the physical network device 88a a command that causes the processor circuit 92 to start ("instantiate") the executable application executing the secure private core network operations 56 on the physical network device 88a as an endpoint device "A" 12, causing an account management service executed in the secure network services 76 to prompt the new subscriber "P1" to register by entering an external network address such as a valid email address of the new subscriber "P1" (e.g., "P1@AA.com"), a mobile number used to receive text-based or image-based messages, etc., where the external network address is used by the requesting party "P1" for reachability via an external data network 96 distinct from the secure peer-to-peer data network 5.

In response to the secure network services 76 (executed by the processor circuit 92 in the physical network device 88a) receiving in operation 100 the request by the user "P1" to register the physical network device 88a as an endpoint device "A" 12, including the external network address (e.g., "P1@AA.com") of the user "P1", the processor circuit 92 of the physical network device 88a executing the account management service in the secure network services 76 on the endpoint device "A" 12 can respond to the external network address entry (e.g., email address) by causing the secure network services 76 in operation 102 to generate a unique private key "prvKeyP1_A" and a public key "KeyP1_A" for the requesting party "P1" on the new endpoint device "A" 12. The account management service executed in the secure network services 76 by the processor circuit 92 on the endpoint device "A" 12 can generate and send in operation 104 a registration request (containing the secure public key "KeyP1_A") 106a to a prescribed destination 108 associated with the secure private core network 10 (e.g., a destination email address "registerme@whitestar.io" owned by the secure private core network 10) that is reachable outside the secure private core network 10 via the external data network 96 (e.g., the Internet, a 5G carrier, etc.). Hence, the device interface circuit 90 of the physical network device 88a can output, via the external data network 96, the registration request 106a received from the processor circuit 92 executing the NOS 56 for transmission, via the external data network 96, to a physical network device 88b hosting a messaging service (e.g., email server "@AA.com") for the subscriber "P1"; the messaging server 88b can forward the message 106a, via the external data network 96, to a physical network device 88c hosting a messaging service (e.g., email server "@whitestar.io") associated with the secure private core network 10 of the secure peer-to-peer data network 5.

The prescribed destination 108 of the registration request 106a can be hosted by the same physical network device 88c receiving the registration request 106a from the transmitting messaging server 88b or a different physical network device (e.g., 88d) in the secure private core network 10 (e.g., within a replicator device 16). The physical network device (e.g., 88c or 88d) hosting the prescribed destination 108 can cause its processor circuit 92 to execute a distributed search (DS) agent 82 in order to execute fraud control in operation 110 using the AI-based security service 64, including determining whether the external network address (e.g., email address "P1@AA.com") specified in the registration request 106a has been previously been used for any registration in the secure private core network 10, whether the external network address has been previously outcasted or "banned" by another subscriber or any AI-based security service 64 as owned by an untrusted party, etc.; the distributed search (DS) agent 82 (executed in the physical network device 88c or 88d) having received the registration request 106a can limit the scope in the availability of the external network address to prevent the MCP device 14 from obtaining any external network address (e.g., email address) "in the clear", for example based on limiting any validation of email addresses to only hashes of email addresses, described below.

In response to detecting that the external network address (e.g., email address) in the registration request is a new external network address and does not appear to be fraudulent, the distributed search (DS) agent 82 (executed in the physical network device 88c or 88d) that executed the fraud control can validate that the external network address can be trusted: in response, the distributed search (DS) agent 82 in operation 112 can cause the secure private core network 10 to generate and send a validation response (e.g., email message, text message, etc.) 114a to the external network address of the new subscriber "P1" (e.g., email "P1@AA.com" hosted by the physical network device 88b) via the external data network 96, where the validation message 114a can include the secure public key "KeyP1_A" generated by the secure network services 76 on the new device "A" 12: the secure public key "KeyP1_A" supplied in the registration request can be expressed in the validation message 114a in different forms, for example a QR code, a URL, or a text string.

Hence, the new subscriber "P1" in operation 116 can utilize the physical network device 88a (or another physical network device 88, as appropriate) to retrieve the validation response from the messaging server 88b "out of band" (i.e., outside the secure private core network 10): the validation response 114a specifies instructions enabling the new subscriber "P1" in operation 116 to submit the secure public key "KeyP1_A" for validation by the secure network services 76 executed on the new device "A" 12, for example in the form of a machine readable QR code, a URL link, or a machine-readable text string.

In response to the secure network services 76 executed on the new device "A" 12 (by the processor circuit 92 of the physical network device 88a) verifying in operation 118 the secure public key "KeyP1_A" in the validation response 114a, the secure network services 76 executed on the new device "A" 12 in operation 120 can register the physical network device 88a as the endpoint device "A" 12 based on auto-generating (crypto-generating) a federation ID "F1" 18 that is allocated to the email address "P1@AA.com" used by the subscriber "P1", thereby establishing a relationship between the email address "P1@AA.com" and the endpoint device "A" 12. The network operating system 56 executed in the endpoint device "A" 12 (within the physical network device 88a) in operation 120 executes registration also based on prompting the new subscriber "P1" to create a new password for entry into the secure data network 5, and by auto-generating (crypto-generating) an endpoint ID 20 for the endpoint device "A" 12 that is a 128 bit UUID (e.g., "EID_A" in FIG. 5A; "E1" in FIG. 2). The creation of a new password by the network operating system 56 ensures that the requesting party "P1" retains exclusive "ownership" (i.e., possession and control) of the endpoint device "A" 12, and thus establishes a two-way trusted relationship between the requesting party "P1" and the corresponding network device "A" based on the requesting party retaining possession and control of the network device.

If the physical network device 88a is to be shared with a second user (e.g., "P3"), then the network operating system 56 can establish a second "profile" for the second user "P3", enabling the second user "P3" to register via the identity management system as described herein for creation of a different federation ID (e.g., "F6") 18 and a different endpoint ID (e.g., "E6") 20 for the same physical network device; in this case, the endpoint object 22 specifying the endpoint ID (e.g., "E6") 20 for the physical device used by the second user "P3" can include a reference indicating the physical network device is shared separately by two federations (e.g., "F1" and "F6"); as apparent from the foregoing, there is no sharing between the two federations sharing the same physical network device unless a two-way trusted relationship is established between the two federations (e.g., "F1" and "F6") according to the prescribed secure salutation protocol.

Hence, the network operating system 56 executed in the endpoint device "A" 12 (by the processor circuit 92 of the physical network device 88a) can store in the memory circuit 94 of the endpoint device "A" 12 a federation object 32 that comprises the federation ID 18 and the endpoint object 22 having an endpoint ID "E1" 20 that uniquely identifies the endpoint device "A" 12 in the secure private core network 10. The federation object 32 stored in the endpoint device "A" 12 identifies the federation "F1" 34 within the secure private core network 10.

The network operating system 56 executed in the endpoint device "A" 12 in operation 122 also can generate a cryptographic nonreversible hash of the external network address (e.g., email address "P1@AA.com"), for example "HASH[P1@AA.com]", that is considered in the secure private core network 10 an acceptable identifier for the federation 34 that is also identified by the federation ID "F1". The nonreversible hash of the external network address guarantees anonymity of the user "P1" while maintaining absolute identity control; hence, an email address of an existing federation 34 can be protected against subsequent registration requests based on utilizing the nonreversible hash of the email address.

The network operating system 56 executed in the endpoint device "A" 12 in operation 124 can identify the MCP device 14 as a prescribed management agent in the secure peer-to-peer data network 5, establish a connection with the MCP device 14 (e.g., via an IP address that is made available to the network operating system executed in the endpoint device "A" 12), and generate and supply a registration message 126a comprising its cryptographic nonreversible hash (e.g., its hashed email address "HASH[P1@AA.com]"), its federation ID "F1" 18, and its endpoint ID "EID_A" that is owned by the federation ID "F1" (e.g., "HASH[P1@AA.com]→F1" and "F1→['EID_A']") (the network operating system 56 executed in the endpoint device "A" 12 also can include its public key "KeyP1_A"). The registration message also can include one or more network addresses (e.g., IP addresses) used by the endpoint device "A" 12 for communications via a data network 96 as a multi-hop transport layer (60 of FIG. 3) underlying the secure peer-to-peer data network 5. The registration message also can specify an "alias" used by the endpoint device "A" 12 as a reference for identifying a keypair (e.g., "KeypairP1_A"), where the network operating system 56 executed in the endpoint device "A" 12 can generate multiple private/public key pairs having respective aliases, for example different cohorts, different data flows, etc.

Referring to FIG. 5B, processor circuit 92 of the physical network device 88e executing the MCP device 14 in operation 128 can respond to receiving the registration message 126a by causing its distributed search (DS) agent (82 of FIG. 1) to execute in operation 130 a projection search on the supplied identifiers "HASH[P1@AA.com]", "F1" 18 and/or "EID_A" 20 to determine if there are any matches. For example, the distributed search (DS) agent 82 can execute a projected search of the cryptographic nonreversible hash "HASH[P1@AA.com]" to determine in operation 130 if there is a match indicating the cryptographic nonreversible hash (generated using the same external network address) has already been used for an existing federation identifier 18 that is already registered in the secure peer-to-peer data network 5.

In response to the distributed search (DS) agent 82 finding no other matches in operation 130, the MCP device 14 in operation 132 can register the new federation 34. Hence, the registration message 126a enables the MCP device 14, as the prescribed management agent for the secure data network 5, to associate the federation ID "F1" 18 as owning the cryptographic hash "HASH[P1@AA.com]" and the endpoint identifier "EID_A" 20; the registration message 126a further enables the MCP device 14 to associate the secure public key "KeyP1_A" with the endpoint identifier "EID_A" 20 owned by the federation ID "F1" 18. As described below, the registration message enables the MCP device 14 to generate and store in operation 132 a data structure, referred to as a "signet", that comprises the secure public key "KeyP1_A" of the endpoint device "A" 12, the "alias" used by the endpoint device "A" 12, a list of one or more network addresses (e.g., IP addresses) usable by the endpoint device "A" 12 for communications via an underlying data network 96 used as a multi-hop transport layer 60, and the endpoint ID "EID_A" 20 of the endpoint device "A" 12.

The MCP device 14, in response to determining there are no matches on the supplied identifiers "HASH[P1@AA.com]", "F1" 18 and/or "EID_A" 20 (indicating an absence of any previous use of the cryptographic nonreversible hash), can acknowledge the registration message based on generating and sending to the endpoint device "A" 12 in operation 134 a secure registration acknowledgment 136 indicating that there are no other endpoints, and can include a public key "Key_MCP" of the MCP device 14; the MCP device 14 can encrypt the public key "Key_MCP" with a temporal key (resulting in the encrypted data structure "ENC(Key_MCP)"), encrypt the temporal key with the secure public key "KeyP1_A" of the endpoint device "A" 12, and supply the encrypted temporal key "ENC(TK)" in the secure registration acknowledgment 136 with the encrypted data structure "ENC(Key_MCP)" to the endpoint device "A" 12. The supplied identifiers "HASH[P1@AA.com]", "F1" and "EID_A" also can be supplied by the MCP device 14 to the directory server 28 for subsequent projection searches in the secure private core network 10.

The network operating system 56 of the endpoint device "A" 12 in operation 138 can receive the secure registration acknowledgment 136 containing a first encrypted portion ("ENC(TK)") and a second encrypted portion "ENC(Key_MCP)". The supply of the encrypted temporal key "ENC(TK)" with the encrypted acknowledgment "ENC(Key_MCP)" in the secure registration acknowledgment 136 enables the network operating system 56 executed in the endpoint device "A" 12 in operation 140 to decrypt the temporal key "TK" using its private key "prvKeyP1_A", decrypt the acknowledgment using the decrypted temporal key "TK", and obtain the secure public key "Key_MCP" of the MCP device 14. Hence, the sharing of secure public keys between the endpoint device "A" 12 and the MCP device 14 establishes a two-way trusted relationship between the endpoint device "A" 12 and the MCP device 14 in the secure private core network.

Hence, at this stage the federation object 32 contains only the endpoint object 22 having an endpoint ID "E1" 20 that uniquely identifies the endpoint device "A" 12 used for initial registration with the secure private core network 10.

Referring to FIGS. 5A, 5B, and 6 the same user "P1" can register a physical network device 88f as a new device "A1" 12 based on installing and instantiating the network operating system 56 on the physical network device 88f, and entering the same external network address (e.g., email address "P1@AA.com") of the subscriber "P1" in response to a prompt by the account management service executed in the secure network services 76 of the network operating system 56; the account management service executed in the secure network services 76 on the physical network device 88f can respond in operation 100 to reception of the external network address (e.g., email address "P1@AA.com") by causing the secure network services 76 to generate in operation 102 a unique private key "prvKeyP1_A1" and a public key "KeyP1_A1" for the user "P1" on the new device "A1" 12, and generate and send in operation 104 the registration request (containing the secure public key "KeyP1_A1") 106b to the prescribed destination (e.g., "registerme@whitestar.io") 108 associated with the secure peer-to-peer data network 5.

As described previously, receipt of the registration request 106b causes a physical network device (e.g., 88c or 88d) executing the distributed search (DS) agent 82 in the secure per-to-peer data network 5 to execute fraud control in operation 110, for example based on determining an inordinate number of registration requests 106. The distributed search (DS) agent 82, having received the registration request, can limit the scope of searching the external network address (e.g., the email address) to prevent the MCP device 14 from obtaining the external network address "in the clear" and can generate and send in operation 112 a validation response 114b to the external network address (e.g., email address "P1@AA.com") of the subscriber "P1", where the validation response can include the secure public key "KeyP1_A1" generated by the secure network services 76 on the new device "A1" 12.

The subscriber "P1" in operation 116 can receive the validation response 114b that specifies instructions (e.g., QR code, URL, text string, etc.) for submitting the included secure public key "KeyP1_A1" for validation. In response to the secure network services 76 executed on the new device "A1" 12 verifying in operation 118 the secure public key "KeyP1_A1" in the validation response 114b, the secure network services 76 executed on the new device "A1" 12 can (temporarily) auto-generate in operation 120 a federation ID "FA1" 18 that is allocated to the external network address (e.g., email address "P1@AA.com") used by the subscriber "P1", establishing a secure relationship between the external network address (e.g., email address "P1@AA.com") and the endpoint device "A1" 12. The network operating system 56 executed in the endpoint device "A1" 12 also can respond to verifying the secure public key "KeyP1_A1" in the validation response 114b by prompting the subscriber "P1" in operation 120 to create a new password for entry into the secure data network 5 via the new device "A1" 12, and by auto-generating (crypto-generating) in operation 120 an endpoint ID 20 for the endpoint device "A1" 12 that is a 128 bit UUID (e.g., "EID_A1" in FIG. 5A; "E2" in FIG. 2).

Hence, the network operating system 56 executed in the endpoint device "A1" 12 can store in the memory circuit 94 of the endpoint device "A1" 12 the federation object 32 that comprises the endpoint object 22 specifying the federation ID "FA1" 18 and having an endpoint ID (e.g., "EID_A1" in FIG. 5A) 20 that uniquely identifies the endpoint device "A1" 12 in the secure private core network 10. The federation object 32 stored in the endpoint device "A1" 12 identifies the federation ID "FA1" 18 within the secure private core network 10.

The network operating system 56 executed in the endpoint device "A1" 12 also can generate in operation 122 a cryptographic nonreversible hash of the external network address (e.g., the email address "P1@AA.com"), e.g., "HASH[P1@AA.com]", connect in operation 124 to the MCP device 14 (e.g., via an IP address that is made available to the network operating system executed in the endpoint device "A1" 12), and supply in operation 124 a registration message 126b.

The registration message 126b generated by the endpoint device "A1" 12 in operation 124 can specify the cryptographic nonreversible hash "HASH[P1@AA.com]", its federation ID "FA1" 18, and its endpoint ID "EID_A1" that is owned by the federation ID "FA1" (e.g., "HASH[P1@AA.com]→FA1" and "FA1→['EID_A1']") (the network operating system 56 executed in the endpoint device "A" 12 also can include its public key "KeyP1_A1"). The network operating system 56 executed in the endpoint device "A1" 12 in operation 124 also can add to the registration message 126b one or more network addresses used for communications via an underlying data network 96 used as a multi-hop transport layer (60 of FIG. 3).

The MCP device 14 can respond to reception of the registration message from the endpoint device "A1" 12 in operation 128 of FIG. 5B by causing its distributed search (DS) agent 82 to execute in operation 130 a projection search on the supplied identifiers "HASH[P1@AA.com]", "FA1" and/or "EID_A1".

In response to determining a match on the cryptographic nonreversible hash "HASH[P1@AA.com]", the distributed search (DS) agent 82 can cause the MCP device 14 to generate in operation 142 and output to the endpoint device "A1" 12 in operation 134 a secure endpoint acknowledgment 144 indicating another endpoint device "A" 12 exists in its federation 34; the acknowledgment generated in operation 142 also can include the signet of the endpoint device "A" 12 that is already a member of the same federation 34. The signet of the endpoint device "A" 12 can include: the secure public key "KeyP1_A" of the endpoint device "A" 12, an "alias" used by the endpoint device "A" 12, reachability information such as a list of one or more IP addresses usable by the endpoint device "A" 12, and the endpoint ID 20 of the endpoint device "A" 12.

As described previously, the MCP device 14 in operation 134 can encrypt the endpoint acknowledgment (containing the signet of the endpoint device "A" 12 and the secure public key "Key_MCP") with a temporal key, encrypt the temporal key with the secure public key "KeyP1_A1" of the endpoint device "A1" 12, and supply the encrypted temporal key in the secure endpoint acknowledgment 144 to the endpoint device "A1" 12. The supplied identifiers "HASH[P1@AA.com]", "F1" and "EID_A1" also can be supplied to the directory server 28 for subsequent projection searches in the secure private core network 10.

The encrypted temporal key in the secure endpoint acknowledgment 144 received by the endpoint device "A1" 12 in operation 138 enables the guardian security agent 66 in the network operating system 56 executed in the endpoint device "A1" 12 in operation 140 to decrypt the temporal key, decrypt the acknowledgment, and obtain the secure public key "Key_MCP" of the MCP device 14.

The guardian security agent 66 in the network operating system 56 executed in the endpoint device "A1" 12 can respond to the decrypted acknowledgment (specifying another endpoint is a member of the same federation 34, and that contains the signet for the endpoint device "A" 12) by initiating in operation 146 a prescribed secure salutation protocol with the endpoint device "A" 12. In particular, the secure network service 76 executed in the endpoint device "A1" 12 can generate and send, based on the received signet, a secure salutation request 148 identifying its endpoint ID "EID_A1" 20 and requesting a relationship with the endpoint device "A" 12; the salutation request can be encrypted using the secure public key "KeyP1_A" of the endpoint device "A" 12, and can include the alias (associated with the secure public key "KeyP1_A"), and also can include the secure public key "KeyP1_A1" of the endpoint device "A1" 12.

The endpoint device "A" 12 can "automatically" respond back with the endpoint device "A1" 12, for example the network operating system 56 executed in the endpoint device "A1" 12 can infer that the endpoint device "A" 12 and the endpoint device "A1" 12 are in the same federation based on a determined match of the hashed external network addresses (e.g., email addresses: for example, a search by a distributed search (DS) agent 82 on a hash of the email address can return the endpoint IDs for both the endpoint device "A" 12 and the endpoint device "A1" 12.

Hence, the network operating system 56 executed in the endpoint device "A" 12 can respond to the salutation request by sending a secure salutation reply (e.g., a salutation acceptance) 150 that includes the endpoint object 22 of the endpoint device "A" 12: the salutation reply 150 can be encrypted as described above using a temporal key that is further encrypted using the secure public key "KeyP1_A1", for formation of a secure salutation reply (e.g., secure salutation acceptance).

Hence, the network operating system 56 executed in the endpoint device "A1" 12 can determine from the endpoint object 22 of the endpoint device "A" 12 specified in the secure salutation reply 150 received in operation 152 that the endpoint object 22 specifies a federation ID "F1" 18: the federation ID "F1" 18 in the endpoint object 22 in the salutation acceptance 150 causes the network operating system 56 in the endpoint device "A1" 12 in operation 152 to determine that the endpoint device "A" 12 pre-existed in the secure private core network 10; hence, the network operating system 56 in the endpoint device "A1" 12 can establish a two-way trusted relationship with the endpoint device "A" 12 based on exchange of the public keys "KeyP1_A" and "KeyP1_A1", and in response re-associate its federation ID in operation 152 from "FA_1" to "F1" in its endpoint object 20, and discard the initial federation ID "FA_1". Consequently, the network operating system 56 in the endpoint device "A1" 12 adopts the federation ID "F1" 18, thus establishing the identity of the owner of the devices "A" and "A1" as federation"F1" 34. Hence, the endpoint device "A1" 12 in its corresponding endpoint object 22 adopts the identity, user name, user image, etc. of the same user as in the endpoint device "A" 12 (as identified by its corresponding endpoint ID 20).

Hence, the secure private core network 10 can establish that the federation "F1" 32 owns the endpoint devices "A" and "A1" 12; moreover, a cohort is established between the endpoint devices "A" and "A1" 12 based on sharing cryptographic keys, such that any content created on one endpoint (e.g., endpoint device "A" 12) can be autonomically and securely replicated to the other endpoint (e.g., endpoint device "A1" 12) by the autonomic synchronizer 52. Since the synchronization process in the secure private core network 10 is aware of all the federations 34, any connection by an existing endpoint device 12 in a federation 34 to a new endpoint device 12 or a new federation 34 can cause autonomic replication of the connection to the other devices in the existing federation 34 or the new federation 34 by the associated autonomic synchronizer 52.

According to example embodiments, an identity management system ensures establishment of trusted two-way trusted relationships in a secure peer-to-peer data network based on ensuring each identity is verifiable and secure, including each federation identity that creates a verified association with an identified external network address used by a requesting party, and each endpoint identifier that is cryptographically generated and associated with a federation identity, enabling a federation identity to own numerous endpoint identifiers for aggregation of two-way trusted relationships in the secure peer-to-peer data network.

Distributed AI-Based Security in a Secure Peer-to-Peer Network

The secure storage and transmission of data structures can be extended between different "federations" of network devices, including endpoint devices (established by different users having established respective two-way trusted relationships with the secure peer-to-peer data network), and replicator devices, according to the prescribed secure salutation protocol under the control of the AI based security suite. Hence, crypto-signed switching can be enabled between two-way trusted network devices in a secure peer-to-peer data network, according to the prescribed secure salutation protocol under the control of the AI based security suite. Additional security-based operations can be deployed in a scalable manner in the secure peer-to-peer data network, based on the distributed execution of the AI-based security suite 64, described below.

FIGS. 7-10 illustrate in further detail an example distributed security that can be implemented among two-way trusted network devices in the secure peer-to-peer data network 5, based on executing a distributed artificial intelligence (AI) based security suite 64 of real-time protection, real-time threat detection, and real-time secure connection management, according to an example embodiment.

A problem in prior deployments of cyber security is that no known security system for a user network device maintained cryptographic security of a data packet having an encrypted payload that is received via a data network. To the contrary, at most a resource in a user network device would decrypt the encrypted payload to recover a decrypted payload, and store the decrypted payload as a local data structure in a memory circuit of the user network device. Hence, the storage of the decrypted payload "at rest" within a memory circuit of the user network device exposed the decrypted payload to a potential cyber-attack.

Although existing encryption applications enabled a user to execute encryption of locally-stored data structures on his or her user network device, such encryption applications are executed at the "application layer", resulting in the exposure of the decrypted data packet at the operating system level until a user executes the encryption application in the user network device for encryption of the locally-stored data structures.

As described below, the AI-based security service 64 of FIGS. 1 and 9 comprises a guardian service 66 (executed by a guardian agent), a sentinel service 68 (executed by a sentinel agent), and a navigator service 70 (executed by a navigator agent). The AI-based services 66, 68, and 70 each have a corresponding "expertise" in providing security-based services, described below.

Each of the AI-based agents 66, 68, and 70 can access sensor data from executable sensor resources in the secure network services 76: "executable sensor resources" refers to executable code that can perform real-time monitoring of compute, storage, packet transmission, packet reception, and other executable operations in a physical network device 88, including monitoring executable operations by the processor circuit 92, monitoring the "activity" or "status" of the processor circuit 92 (e.g., metrics associated with processor utilization), monitoring the "activity" or "status" of the memory circuit 94 (e.g., metrics associated with memory utilization, including tracking read/write operations), and monitoring the "activity" or "status" of the device interface circuit 90 (e.g., metrics associated with number of transmission or reception of data packets, including packet size, packet source/destination, etc.). The sensor data generated by the executable resources can identify various threat "features" that are detected in the corresponding physical network device 88, for example during runtime execution of any component of the network operating system 56, during any read/write access of any "at-rest" secure data structure, and/or during any transmission or reception of any "in-flight" secure data structure. Each of the AI-based agents 66, 68, and 70 can apply machine learning to the threat features, for example based on a corresponding prescribed minimum set of heuristics and policies, in order to identify an optimized security action that needs to be executed. The prescribed minimum set of heuristics and policies (included during installation of a network operation system 56 in a physical network device 88) provides to each of the AI-based agents 66, 68, and 70 a "baseline" understanding of machine learning-based operations that can be completed, without involvement by the user. Each of the AI-based agents 66, 68, and 70 also can execute iterative learning based on presenting a user with various security options, and updating its set of heuristics and policies in response to a user selecting an identified security option; in other words, each of the AI-based agents 66, 68, and 70 can "learn" from the actions of the user of the physical network device 88, in order to create and update a decision tree that enables improved decisions autonomically (similarly, a notification that the user has overridden an autonomically-selected security option can cause a negative weighting to be applied to the heuristics for the relevant features within the decision tree).

The AI-based agents 66, 68, and 70 can interactively cooperate in order to provide a real-time security system that can dynamically respond to detected threats with an appropriate response that minimizes disruption where possible. Each of the AI-based services 66, 68, and 70 also can "enhance its knowledge" over its corresponding prescribed minimum set of heuristics and policies, based on communicating (using autonomic synchronization) with peer AI-based agents in other network devices 88 in the secure data network 5. The autonomic synchronization with peer AI-based agents enables the AI-based agents 66, 68, and 70 to provide coordinated machine-learning based protection against threats, detection of threats, and mitigation against threats based on the aggregate knowledge obtained by the AI-based security services throughout the secure data network 5.

Hence, the example embodiments optimize network security throughout the secure data network 5 based on providing each physical network device 88 (including those executing the endpoint devices 12) with an AI-based security system 64 comprising AI-based agents 66, 68, and 70 that each execute machine learning and that each interact to provide optimized security services in real time; moreover, each of the AI-based agents 66, 68, and 70 can autonomically synchronize with peer AI-based agents throughout the secure data network 5 for real-time knowledge aggregation and distributed threat detection and mitigation at a network edge where the threat is first detected. Hence, malicious behavior can be identified and mitigated at the network edge (e.g., at an endpoint device 12) before the threat can reach to inside the secure private core network 10.

Figure 10A:
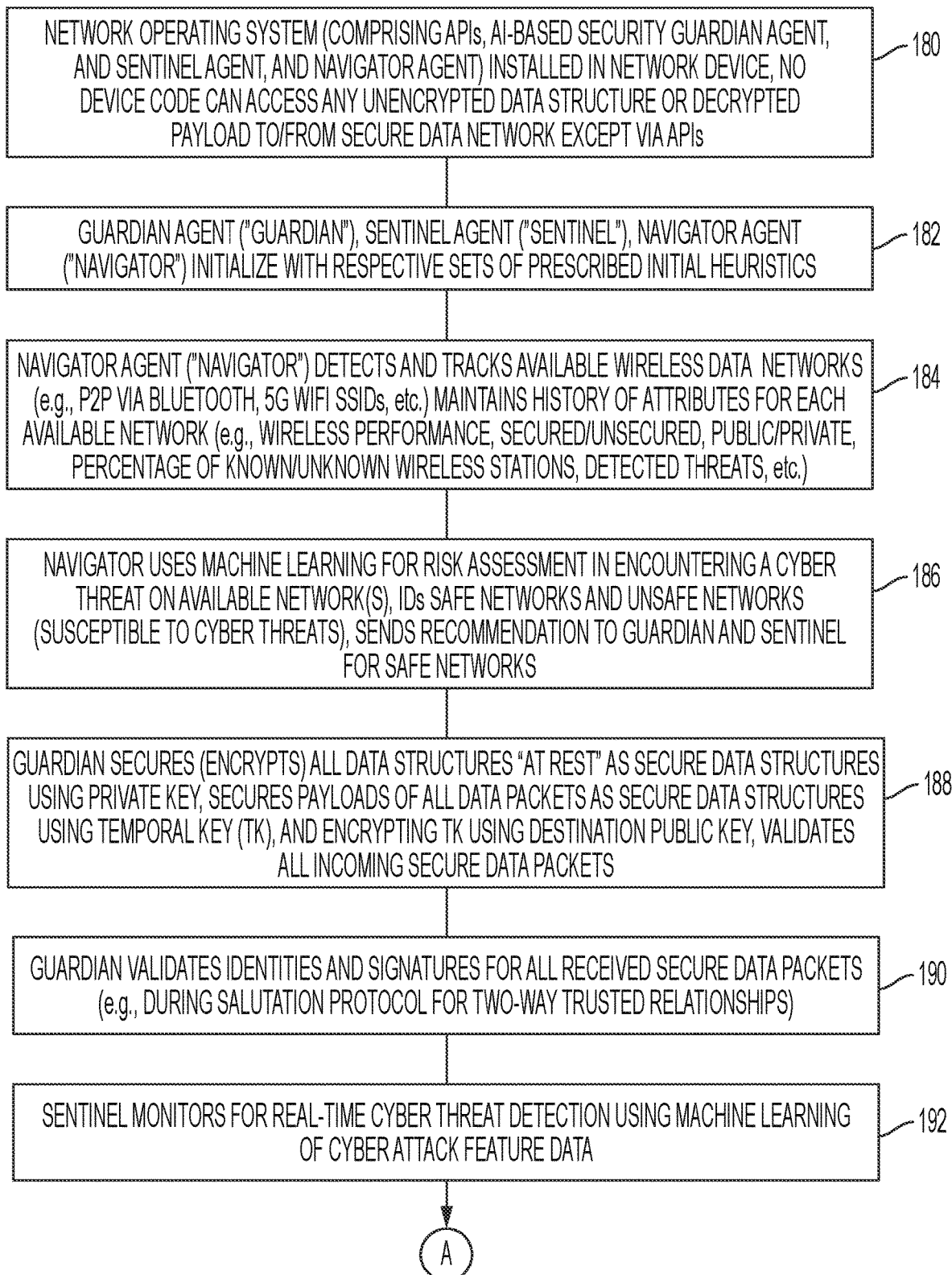
FIGS. 10A-10E illustrate a method of the distributed artificial intelligence (AI) based security suite of real-time protection, real-time threat detection, and real-time secure connection management, according to an example embodiment.

Referring to FIG. 10A, installation and instantiation in operation 180 of the network operating system 56 in a physical network device (e.g., 88*a*) causes execution of each of the executable components, including the secure P2P network transport 74, the secure network services 76 including the AI-based security suite 64 (containing the AI-based agents 66, 68, and 70), the security policy enforcement 78, and the APIs 80. As described previously, access to the secure private core network 10 by any physical network device 88 requires installation and instantiation of the network operating system. Further, the network operating system 56 operates as a secure executable container that only allows access to an internal executable code, access to an "at-rest" or "in-flight" stored data structure, or access to the secure data network 5 only via one or more of the prescribed APIs 80.

Hence, the network operating system 56 in operation 180 prevents any executable resource in a physical network device 88 (or a user of the physical network device 88) from accessing any unencrypted form of any "at-rest" first secure data structures encrypted and stored by the network operation system 56 in the physical network device 88, without authorized access via a prescribed API 80. The network operating system 56 also prevents any executable resource in the physical network device 88 (or a user of the physical network device 88) from accessing any unencrypted form of any "in-flight" second secure data structures encrypted and stored by the network operation system 56, without authorized access via a prescribed API 80. The network operating system 56 also prevents any executable resource in the physical network device 88 (or a user of the physical network device 88) from accessing the secure peer-to-peer data network, without authorized access via a prescribed API 80 required by the network operating system 56.

Hence, the network operating system 56 in operation 180 establishes a "closed" access system that requires authorized access via one or more of the APIs 80.

The AI-based guardian security agent 66, the sentinel security agent 68, and the navigator security agent 70 in operation 182 initialize with respective sets of prescribed minimum set of heuristics and policies that provide a "baseline" understanding of machine learning-based operations that can be completed, without involvement by the user. As described below, each guardian security agent 66, sentinel security agent 68, and navigator security agent 70 can aggregate (i.e., add to) its corresponding the prescribed initial heuristics based on iterative learning, and based on autonomic synchronization (using the autonomic synchronizer 52) with other peer agents 66, 68, and 70.

The navigator security agent 70 is configured for maintaining the expertise of "navigating" toward safe networks and away from hazardous networks that are susceptible to cyber-attacks. The navigator security agent 70 in operation 184 can detect and track available wireless data networks, for example P2P links (e.g., Bluetooth), 5G wireless data links, WiFi Service Set Identifiers (SSIDs), etc. The navigator security agent 70 in operation 184 can maintain a history of attributes for each of the available wireless data networks, and execute machine learning in order to identify an "optimum" wireless network connection for an endpoint device (e.g., the endpoint device "A" 12). The navigator security agent 70 in operation 184 can extract wireless network feature data from the attributes (e.g., wireless performance, secured/unsecured network, percentage of known or unknown wireless network stations, detected threats, etc.) in order to populate its ML-based decision tree for executing a risk assessment.

In particular, the navigator security agent 70 in operation 186 can execute ML-based risk assessment to determine, for each detected wireless data network, a corresponding risk assessment that identifies a corresponding risk in encountering a cyber threat on the corresponding wireless data network. The navigator security agent 70 thus in operation 186 can identify safe networks (that avoid a cyber threat) and unsafe networks that are susceptible to cyber threats, and supply in operation 186 a recommendation to the guardian security agent 66 and/or the sentinel security agent 68 for navigation to a safe network. In other words, the navigator agent 70 can be configured for executing machine learning to "navigate" away from hostile or suspect wireless data networks that are susceptible to cyber-attack, and to "navigate" toward safe networks that can minimize cyber-attacks. As a result, the navigator agent 70 can balance between the need to communicate with other network devices versus the threat envelope that each network presents.

Hence, the recommendation sent to the guardian security agent 66 and/or the sentinel security agent 68 can cause the device interface circuit 90 of a physical network device (e.g., the physical network device 88*a*) to connect to a safe wireless data link for secure communications with a second network device (e.g., the MCP device 14) for establishment of a secure two-way relationship with the second network device (e.g., according to the salutation protocol).

The guardian security agent 66 in operation 188 can secure (i.e., encrypt) all "at-rest" data structures as first secure data structures for secure storage in the network device, for example based on encrypting each "at-rest" data structure with a corresponding private key 172: for example, the guardian security agent 66 executed in the endpoint device "A" 12 can secure the "at-rest" data structures using the private key "prvKeyP1_A" 172*b* that can be dynamically generated by the guardian security agent 66 during initialization of the network operating system 56. The guardian security agent 66 in operation 188 (executed, for example, by the endpoint device "A" 12) also can secure "in-flight" data structures as second secure data structures (158 of FIG. 8) based on dynamically generating a temporal key "TK" (68 of FIG. 8), and encrypting the temporal key 68 with a public key (e.g., "Key_B") 198 of a destination device (e.g., the endpoint device "B" 12), ensuring secure communications in the secure peer-to-peer data network 5. Additional details regarding encrypting "at rest" data structures and "in-flight" data structures are described below, and are also disclosed in the above-incorporated U.S. Publication No. 2021/0028940.

Figure 8:
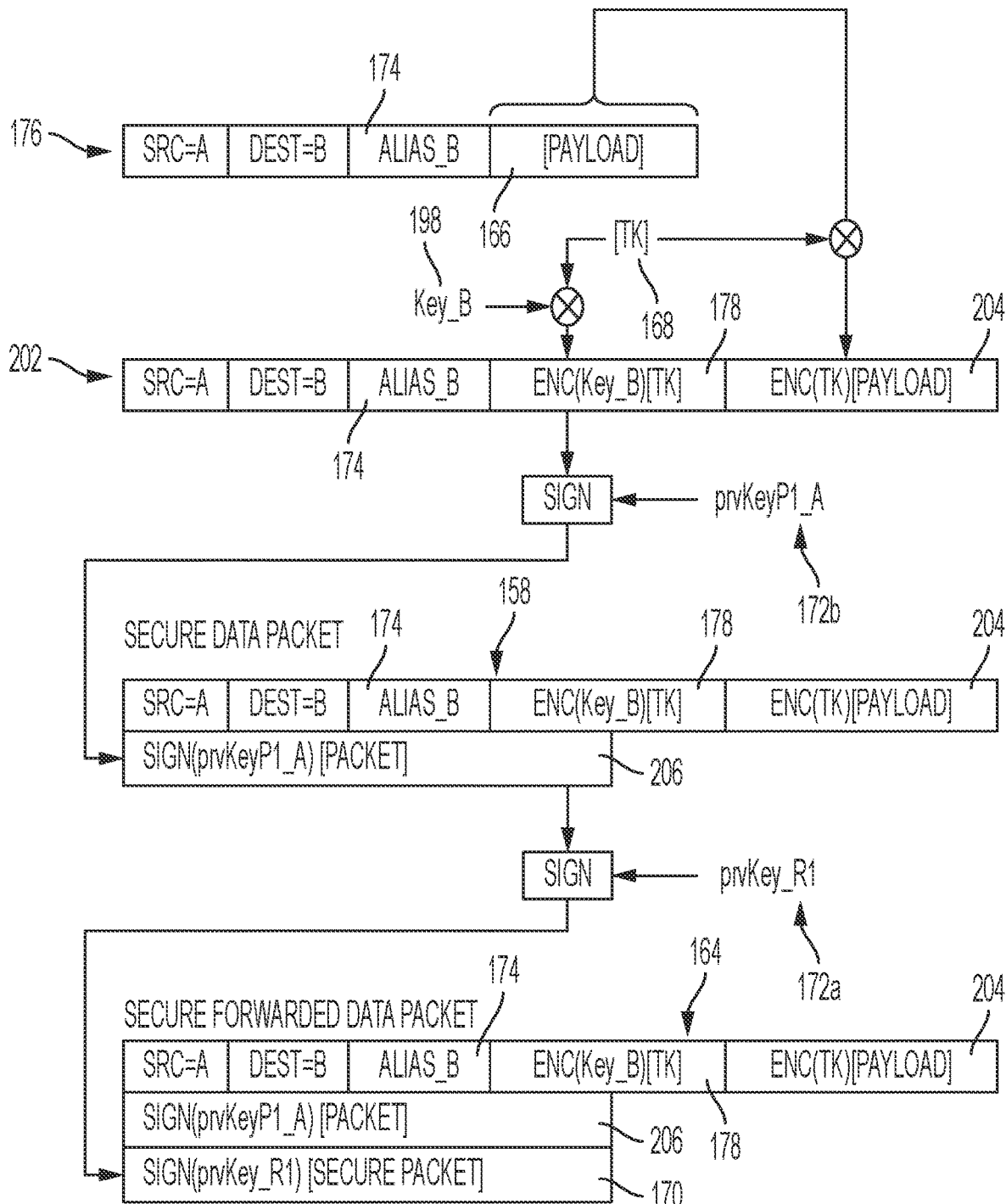
FIG. 8 illustrates crypto-signed switching based on generation of a secure data packet by a distributed AI-based security suite in an endpoint device, and generation of a secure forwarded packet by distributed AI-based security suite in a first replicator device for secure transmission to a second replicator device and packet verification based on comparing hashes of encrypted temporal keys, according to an example embodiment.

In particular, the guardian security agent 66 of a source network device (e.g., an endpoint device "A" 12) in operation 188 can encrypt an "in-flight" data packet into a secure data packet (e.g., 158 of FIG. 8) based on dynamically generating a unique temporal key (e.g., "TK" 168 of FIG. 8) used for encrypting a data packet payload (e.g., 166 of FIG. 8) into an encrypted payload (e.g., 204 of FIG. 8), and encrypting the unique temporal key 168 into an encrypted temporal key (e.g., "ENC(Key_B)[TK]" 178 of FIG. 8) using a secure public key (e.g., "Key_B" 198 of FIG. 8) of a destination device (e.g., endpoint device "B" 12) identified within a destination address field (e.g., "DEST=B"). In other words, the guardian security agent 66 of the source endpoint device dynamically generates a new temporal (e.g., time-based) key "TK" 168 for each secure data packet 158 to be transmitted, ensuring no temporal key 168 is ever reused; moreover, the encrypted temporal key 178 ensures that only the destination device can decrypt the encrypted temporal key 178 to recover the temporal key 168 used to encrypt the payload 166.

The guardian security agent 66 of a source network device (e.g., an endpoint device "A" 12) in operation 188 also can digitally sign the packet 202 (containing the encrypted payload 204 and encrypted temporal public key 178) using the endpoint device A's private key "prvKeyP1_A" (172b of FIG. 8) to generate a source endpoint signature 206. Hence, the guardian security agent 66 can generate the secure data packet 158 for secure "in-flight" communications in the secure peer-to-peer data network 5.

Figure 7:
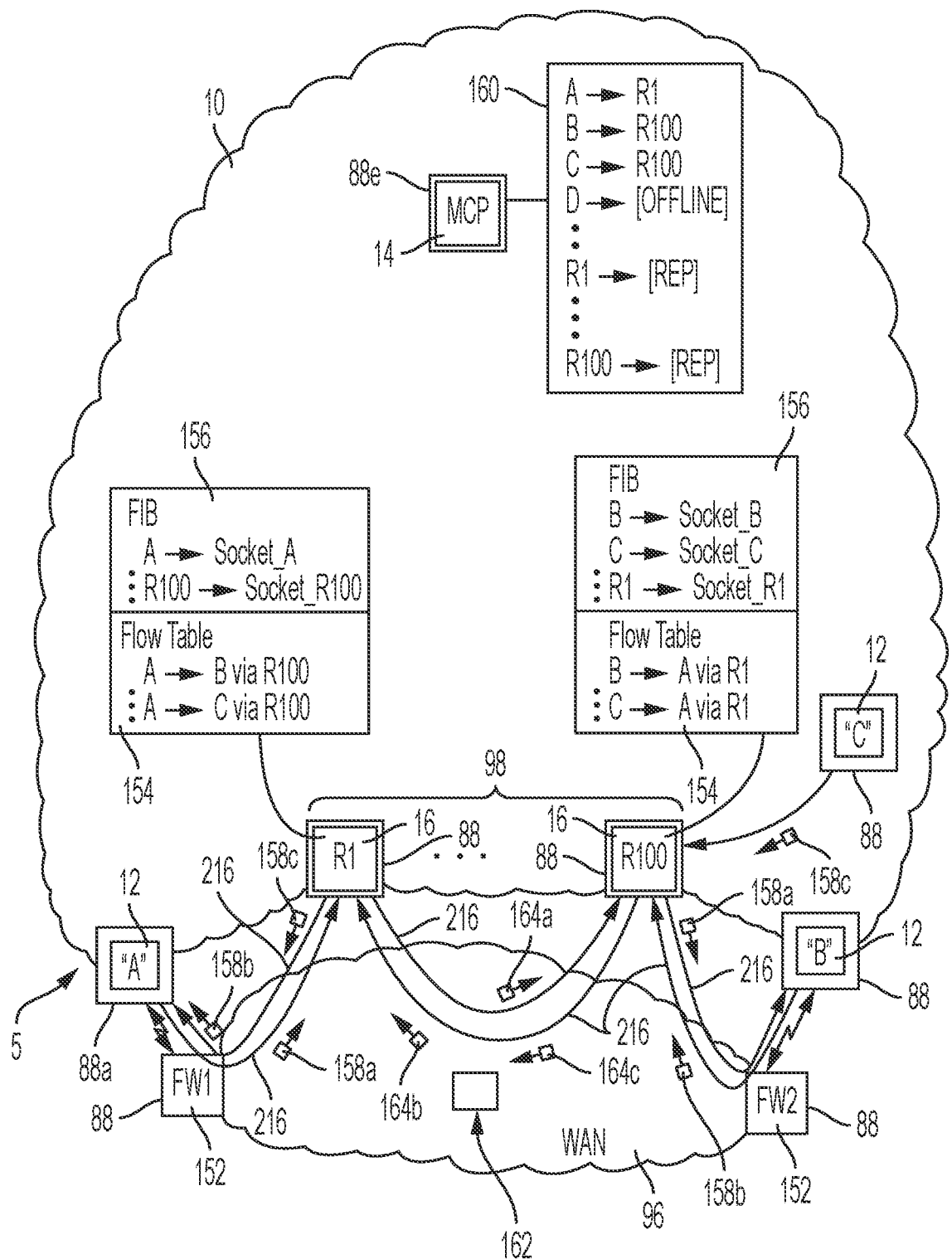
FIG. 7 illustrates crypto-signed switching between two-way trusted network devices in a secure peer-to-peer data network, according to an example embodiment.

The source endpoint signature 206 generated by the guardian security agent 66 in the source network device (e.g., the endpoint device "A" 12) enables the guardian security agent 66 of a receiving network device (e.g., the replicator device "R1" 16, and/or the endpoint device "B" 12 of FIG. 7) in possession of the public key "KeyP1_A" to validate in operation 188 that the secure data packet is from the endpoint device "A" 12. The guardian security agent 66 of the receiving network device also can validate an incoming secure data packet based on determining that the receiving network device (e.g., the replicator device "R1" 16, and/or the endpoint device "B" 12 of FIG. 7) has a trusted two-way relationship with the source network device as described above, where the source network device can be identified by the source address field "SRC=A".

Hence, the guardian security agent 66 of a receiving network device (e.g., the replicator device "R1" 16 or the endpoint device "B" 12 in FIG. 7) in operation 190 can validate an identity for a received secure data packet 158, based on validating a source endpoint signature 206 using the corresponding public key (e.g., "KeyP1_A") of the source network device (e.g., the endpoint device "A" 12), and based on the guardian security agent 66 of the receiving network device determining in operation 190 that it has a trusted two-way relationship with the source network device identified in the source address field.

As illustrated in FIGS. 7 and 8, the guardian security agent 66 of each of the replicator devices "R1" and "R100" 16 also can enforce crypto-signed switching based on validation of a replicator signature 170. In particular, following validation of the secure data packet 158 of FIG. 8, the guardian security agent 66 of the replicator device (e.g., "R1") 16 can cryptographically sign in operation 188 the secure data packet (e.g., 158a of FIG. 7), using its private key "prvKey_R1" 172a to generate a replicator signature 170 for secure transmission to its trusted peer replicator device "R100" 16 as a secure forwarded packet (e.g., 164a) containing the secure data packet (e.g., 158a) and the replicator signature 170, ensuring no network node 162 in the underlying external data network 96 can decrypt the secure data packet (e.g., 158a) contained in the secure forwarded packet (e.g., 164a).

Similarly, the guardian security agent 66 of a replicator device (e.g., "R100") 16 can determine in operation 190 that the cryptographically-signed secure forwarded packet (e.g., 164a of FIG. 7) is received from a trusted peer replicator device (e.g., "R1") 16, and can execute validation of the secure forwarded packet (e.g., 164a) based on verifying the replicator signature 170 in the secure forwarded packet using the public key "Key_R1" of the replicator device "R1" 16. As described below, the guardian security agent 66 and/or the sentinel security agent 68 of the replicator device (e.g., "R100") can verify the secure forwarded packet is not a replay attack. The replicator device (e.g., "R100") can respond to successful validation of the secure forwarded packet (containing the secure data packet 158a) by forwarding the secure data packet (e.g., 158a) to its attached destination endpoint device (e.g., "B") 12, maintaining the cryptographic security of the secure data packet (e.g., 158a) for decryption by the attached destination endpoint device "B" 12 following validation of the secure data packet (e.g., 158a) by the guardian security agent 66 in the destination endpoint device "B" 12.

Hence, the guardian security agent 66 can validate identities for establishment and enforcement of all two-way trusted relationships, including during execution of the prescribed secure salutation protocol as described previously in operations 140 and 146 of FIG. 5B.

The secure network services 76 executed in each physical network device 88 also includes a sentinel service 68. The sentinel service 68 is implemented in each physical network device 88 as executable code (e.g., an executable "agent") within the secure network services 76; hence, the sentinel service 68 also can be referred to herein as a sentinel agent 68.

The sentinel agent 68 maintains the expertise of monitoring in operation 192 for real-time detection of any cyber threats or cyber-attacks. The sentinel agent 68 is configured in operation 192 for detecting in real time a threat in the physical network device 88 based on sensor data from the executable sensors in the secure network services 76.

Figure 10B:
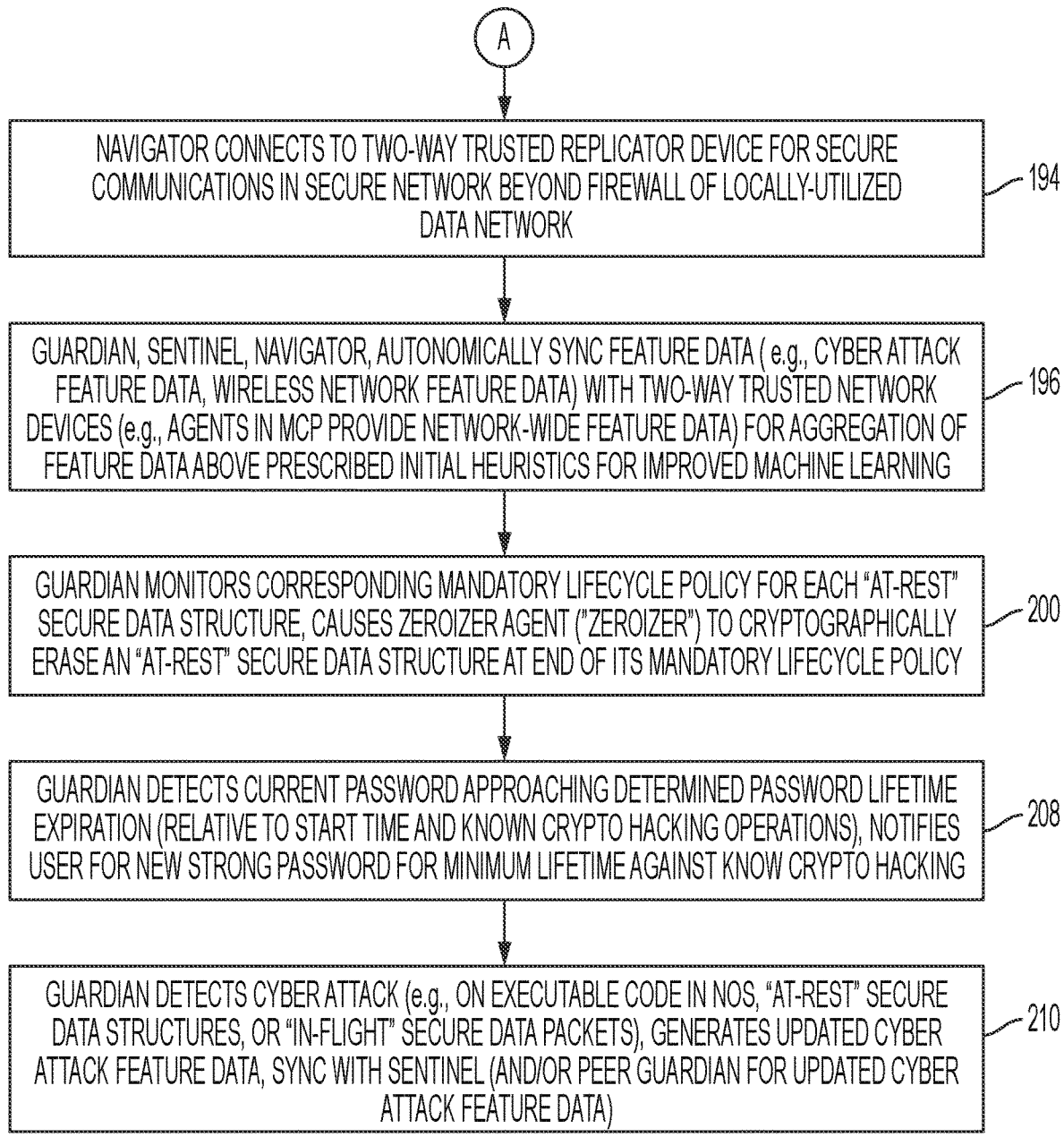

Referring to FIG. 10B, the navigator security agent 70 of an endpoint device (e.g., the endpoint device "A" 12) in operation 194 can enable secure communications to be established through a firewall (e.g., "FW1" 152 of FIG. 7) of a locally-utilized wireless data network, based on establishing a two-way trusted relationship with a replicator device (e.g., "R1" 16) in the secure peer-to-peer data network 5, for example according to the prescribed secure salutation protocol. As illustrated in FIG. 7, the "mesh" 98 of interconnected replicator devices 16 enables the replicator device "R1" 16 to provide reachability to the destination network device "B" via a second replicator device "R100" 16.

In particular, the crypto-signed switching described herein is based on the MCP device 14, as the prescribed management agent in the secure peer-to-peer data network 5, tracking a connection status 160 of every network device in the secure peer-to-peer data network 5, including each endpoint device 12 and each replicator device 16. The MCP device 14 establishes a pairwise topology (e.g., a mesh) 98 of two-way trusted replicator devices 16 based on causing the guardian security agent 66 of each replicator device 16, during registration with the MCP device 16, to execute a prescribed secure salutation protocol with each and every other replicator device 16 in the secure private core network 10. The MCP device 14 also causes the guardian security agent 66 of each endpoint device 12, during registration with the MCP device 16 (or in response to the endpoint device 12 returning from an "offline state" to an "online" state), to establish in operation 194 a two-way trusted relationship with an identified replicator device (selected by the MCP device 16) based on executing a prescribed secure salutation protocol with the identified replicator device 16; hence, the navigator security agent 70 executed in the endpoint device "A" 12 can create an entry specifying that a replicator device is reachable via an identified wireless data link between the endpoint device "A" 12 and the firewall device "FW1" 152.

The MCP device 14 also can identify, for a requesting replicator device (e.g., "R1") 16, a peer trusted replicator device (e.g., "R100") 16 for reaching a destination endpoint device (e.g., "B"), even if the secure peer-to-peer data network 5 utilizes the external data network 96 where each endpoint device 12 can be physically located in a wireless local area network that is secured by a security appliance (e.g., a firewall device) 152, and replicator devices 16 forward secure forwarded packets 164 via the external data network 96.

The example embodiments also are particularly effective in cases where actual deployment is via an existing IP network infrastructure 96, for example where the endpoint device "A" is connected within a first private (e.g., "home 1") IP network secured by a first firewall device "FW1" 152, and the second endpoint device "B" is connected within a second private (e.g., "home 2") IP network secured by a second firewall device "FW2" 152. The navigator security agents 70 of the endpoint devices "A" and "B" can dynamically establish a secure virtualized peer-to-peer connection, using crypto-switching via the pairwise topology 98 in the secure private core network 10, in a manner that maintains security and trust and while maintaining secrecy of the data traffic as it traverses through the secure private core network 10 via the underlying external data network 96; in other words, the crypto-switching via the pairwise topology 98 ensures that no core component (e.g., replicator device 16 or the MCP device 14) is capable of detecting the contents of any payload transmitted by endpoint devices "A" or "B".

The replicator devices "R1" and "R100 16 can create a flow table entry 154 that maintains a flow state for reaching a destination endpoint device via an identified trusted peer replicator device 16; each replicator device 16 also can establish a forwarding information base (FIB) entry 156 that enables the replicator device 16 to reach each trusted peer replicator device 16 and each connected endpoint device 12**.

Hence, the navigator security agent 70 in operation 194 enables secure communications to reach endpoint devices 12 located "behind" a security appliance 152, since the endpoint device (e.g., "A") 12 can execute the prescribed secure salutation protocol with the identified replicator device 16, causing the associated secure appliance (e.g., "FW1") 152 to create a state entry that identifies the replicator device (e.g., "R1") 16, for example based on the IP address of the replicator device (e.g., "R1") 16 that is specified in the destination address field of a secure data packet (e.g., 158a of FIGS. 7 and 8). The state entry created by the security appliance 152 also can be updated in response to the endpoint device "A" 12 sending a secure data packet (e.g., 158a) to its replicator device (e.g., "R1") 16; hence, the state entry created by the secure appliance (e.g., "FW1") 152 enables the replicator device (e.g., "R1") 16 to send a second secure data packet (e.g., 158b) back to the endpoint device (e.g., "A") 12 via the secure appliance (e.g., "FW1") 152.

Each of the guardian security agent 66, the sentinel security agent 68, and the navigator security agent 70 (e.g., within the endpoint device "A" 12 illustrated in FIG. 9) in operation 196 of FIG. 10B can utilize its local autonomic synchronizer 52 for autonomic synchronization of feature data with a corresponding guardian security agent 66, sentinel security agent 68, and/or navigator security agent 70 that is executed in another two-way trusted network device (e.g., the MCP device 14 or the endpoint device "B" 12). For example, any one of the guardian security agent 66 or sentinel security agent 68 of the endpoint device "A" 12 in operation 196 can execute autonomic synchronization for autonomously exchanging cyber-attack feature data with a corresponding guardian security agent 66 or sentinel security agent 68 in the MCP device 14 (and/or the endpoint device "B" 12), for autonomic aggregation of machine learning-based cyber-attack feature data in the secure peer-to-peer data network.

Hence, the guardian agent 66 and/or the sentinel security agent 68 of the endpoint device "A" 12 in operation 196 can become "smarter" in its AI-based protection based on an aggregation of AI-based features that have been extracted by the machine learning operations executed by the guardian agent 66 in response to received cyber-attack sensor data. The sharing of AI-based features with other physical network devices 88 based on autonomic synchronization enable the AI-based features to be autonomically distributed throughout each of the physical network devices in the secure data network 5, including the MCP device 14.

Similarly, the navigator security agent 70 of the endpoint device "A" 12 in operation 196 can autonomically exchange wireless network feature data describing the history and cyber-attack feature data associated with a detected cyber threat to a navigator security agent 70 executed in the MCP device 14. Hence, the navigator security agent 70 of the endpoint device "A" 12 in operation 196 can receive, from the navigator security agent 70 of the MCP device 14, relevant wireless network feature data describing prior wireless networks encountered by other user network devices in the secure peer-to-peer data network 5, for example location-specific wireless network feature data based on the current or future location(s) of the endpoint device "A" 12.

Consequently, the navigator security agent 70 of the endpoint device "A" 12 in operation 196 can aggregate the wireless network feature data with the history of each of the wireless data networks, for machine learning-based risk assessment of the wireless data networks that are available for connection by the wireless network device.

The guardian security agent 66 in a physical network device 88 can monitor in operation 200 the corresponding mandatory lifecycle policy "L" (24 of FIG. 2) for each "at-rest" secure data structure that is stored in the memory circuit 94. In particular, each data structure that is created in the secure data network 5, including every endpoint object 22, every message object 36, and every conversation object 42, has a corresponding mandatory lifecycle policy "L" 24 that defines the lifecycle (i.e., lifetime) of the corresponding data structure. Hence, the guardian agent 66 can ensure in operation 200 that each and every data structure, upon expiration of its corresponding lifecycle 24, is permanently erased in a cryptographically secure manner ("zeroization") autonomically from every storage location in the secure data network 5. Consequently, in contrast to existing application-layer resources that can guide a user to "clean up" stale data structures stored on a computer, the example embodiments provide a network operating system 56 that requires a data structure at creation to be assigned a corresponding mandatory lifecycle policy "L" 24.

The implementation of a mandatory lifecycle policy "L" 24 for each and every data structure eliminates the problem of attempting to securely store all data for all time: the imposition of a mandatory lifecycle policy 24 for each data structure in the secure data network 5 ensures that the guardian agent 66 can provide secured management of data structures that are "at-rest" or "in-flight" in a scalable manner.

The guardian security agent 66 in a physical network device 88 also can detect in operation 208 that that a password utilized by a user for securing the network device (as described above with respect to operation 120 of FIG. 5A) is approaching a determined password lifetime expiration, where the determined password lifetime expiration can be based on a comparison of the password relative to a start time and known cryptographic hacking operations: additional details regarding determining a password lifetime expiration are described in U.S. Publication No. 2021/0081524. The guardian security agent 66 in the physical network device 88 also can notify the user (via a user interface display 218 associated with the device interface circuit 90) of the determined password lifetime expiration, requiring the user to update to a new password having a sufficient strength over a prescribed minimum password lifetime relative to the known cryptographic hacking operations.

The guardian security agent 66 in a physical network device 88 can detect in operation 210 a cyber-attack, for example a cyber-attack on executable code within the network operating system 56, a cyber-attack on an "at-rest" secure data structure stored in the memory circuit 94, and/or a cyber-attack on "in-flight" secure data packets 158 or 174. In response to detecting a cyber-attack, the guardian security agent 66 in the physical network device 88 can generate updated cyber-attack feature data that describes the cyber-attack, and autonomically sync with the sentinel security agent 68 in the physical network device 88 (or with a peer sentinel security agent 68 in a trusted peer device) for updating of the cyber-attack feature data in the secure peer-to-peer data network 5.

In particular, the guardian security agent 66 in operation 210 can receive cyber-attack sensor data from the executable sensors in the secure network services 76, where the executable sensors can be configured to monitor the data structures that are in-flight or at-rest; the executable sensors also can be configured to monitor the associated lifecycle policies "L" 24, and/or to detect a presence of a cyber-attack on one or more of the data structures. In response to an executable sensor detecting a cyber-attack on a data structure, the executable sensor can send cyber-attack sensor data describing the cyber-attack to the guardian agent 66. The guardian agent 66 can generate, based on the cyber-attack sensor data, cyber-attack feature data that can be extracted based on AI-based machine learning in order to provide updated security parameters for improved and "smarter" protection of the secure peer-to-peer data network 5 against future cyber-attacks by the AI-based security agents 64.

Hence, the guardian security agent 66 in operation 210 can autonomically exchange cyber-attack feature data with a corresponding guardian security agent 66 in one or more trusted network devices (e.g., the MCP device 14 and/or the endpoint device "B" 12 of FIG. 9), for autonomic aggregation of machine learning-based cyber-attack feature data in the secure peer-to-peer data network 5.

Figure 10C:
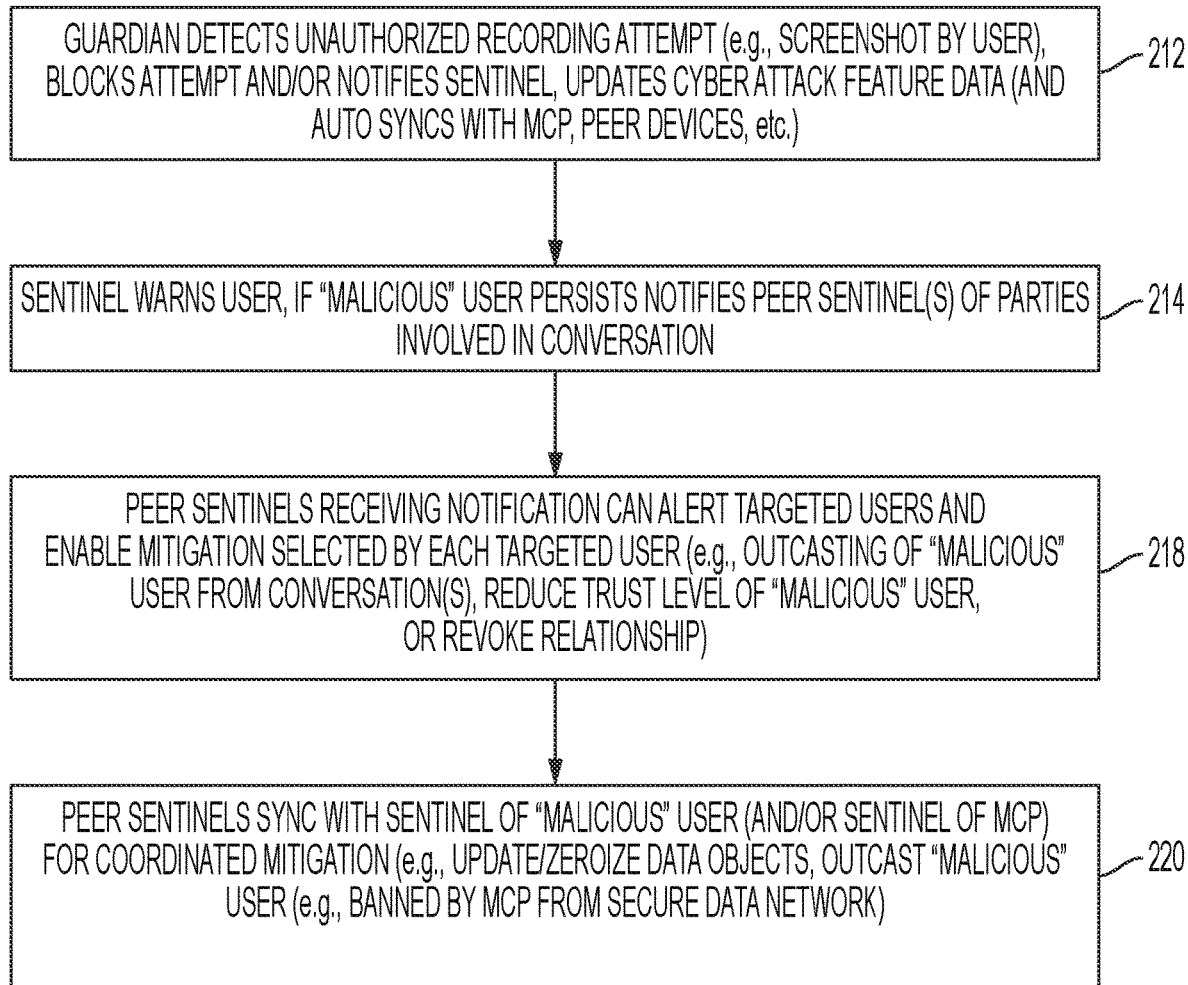

Referring to FIGS. 9 and 10C, the guardian security agent 66, the sentinel security agent 68, and the navigator security agent 70 in a physical network device 88 can provide coordinated protection based on exchanging notifications and recommendations. For example, the guardian security agent 66 of the endpoint device "A" 12 in operation 212 can protect against identity theft by detecting an unauthorized recording attempt, by a user of the endpoint device "A" 12, of a network communication from a user from the federation "F2" 34 using the endpoint device "B" 12: the unauthorized recording attempt by the user from the federation "F1" 34 using the endpoint device "A" 12 can be, for example, an attempted screenshot of a message object (e.g., a private digital picture owned by the user of the federation "F2" 34), or an unauthorized recording attempt of a secure media stream output by the user from the federation "F2" 34 using the endpoint device "B" 12 (e.g., a private voice or video call, or a streaming media presentation of streaming media content owned by the user from the federation "F2" 34).

The guardian security agent 66 of the endpoint device "A" 12 can respond in operation 212 to the unauthorized recording attempt by blocking the unauthorized recording attempt by the user of the endpoint device "A" 12. The guardian security agent 66 of the endpoint device "A" 12 in operation 212 also can update cyber-attack feature data identifying the user of the federation "F1" 34 having executed an unauthorized recording attempt (e.g., for tracking terms of service violations); the guardian security agent 66 of the endpoint device "A" 12 in operation 212 also can autonomically synchronize the updated cyber-attack feature data with other trusted devices, for example the guardian security agent 66 executed in the MCP device 14, and the guardian security agent 66 executed in the targeted endpoint device "B" 12.

In physical network devices 88 that prevent blocking of a screen capture (as in IOS devices), the guardian security agent 66 of the endpoint device "A" 12 in operation 212 also can notify the sentinel security agent 68 executed within endpoint device "A" 12 of the unauthorized recording attempt by the user. The sentinel security agent 68 (e.g., in endpoint device "A") can detect the screenshot by a user, and in response the sentinel security agent 68 can take its own corresponding screenshot (mirroring the screenshot taken by the user), and send a warning to the user of the endpoint device "A" 12 that the user is violating terms of service associated with use of the secure peer-to-peer data network 5, which can serve as a negative feedback that can influence the user of the endpoint device "A" 12 from further unauthorized recording attempts.

The sentinel security agent 68 in operation 214 also can send the screenshot to a corresponding destination sentinel security agent 68 for the endpoint device(s) (e.g., "B", "C") 12 of each and every person in communication with the user of the endpoint device "A" 12 at the time the screenshot was taken. Each destination sentinel security agent 68 can respond to the received screenshot by notifying in operation 218 the corresponding user by presenting the received screenshot, and presenting the destination user(s) (e.g., users of devices "B" and "C") with various mitigation options, including an option to remove ("outcast") the user of device "A" from the current conversation, reduce a "trust" level of the malicious user, or revoke the trusted two-way relationship.

The peer sentinel security agents 68 in operation 220 can execute autonomic synchronization with the sentinel security agent 68 of the endpoint device "A" 12 owned by the malicious user (and/or the sentinel security agent 68 of the MCP device 14), for distributed and coordinated execution of the selected mitigation operations. The selected mitigation operations can include any one or more of update conversation objects 42 to remove the malicious user from a subscriber list 50 ("outcasting"), zeroizing relevant message objects 36 and/or conversation objects 42 from the endpoint device "A" 12, or network-wide instantaneous outcasting and permanent removal of the user of the federation "F1" 34 from the secure peer-to-peer data network 5. The sentinel security agent 68 in the endpoint device "A" 12 and/or the MCP device 14 can execute instantaneous outcasting based on zeroizing every data object 22, 36, and/or 42 that references the federation "F1" 18 in any endpoint device "A" and "A1" owned by the user of the federation "F1" 34, and updating any other data object 22, 36, and/or 42 in the secure peer-to-peer data network 5 to remove the reference to the federation identifier "F1" 18.

Figure 10D:
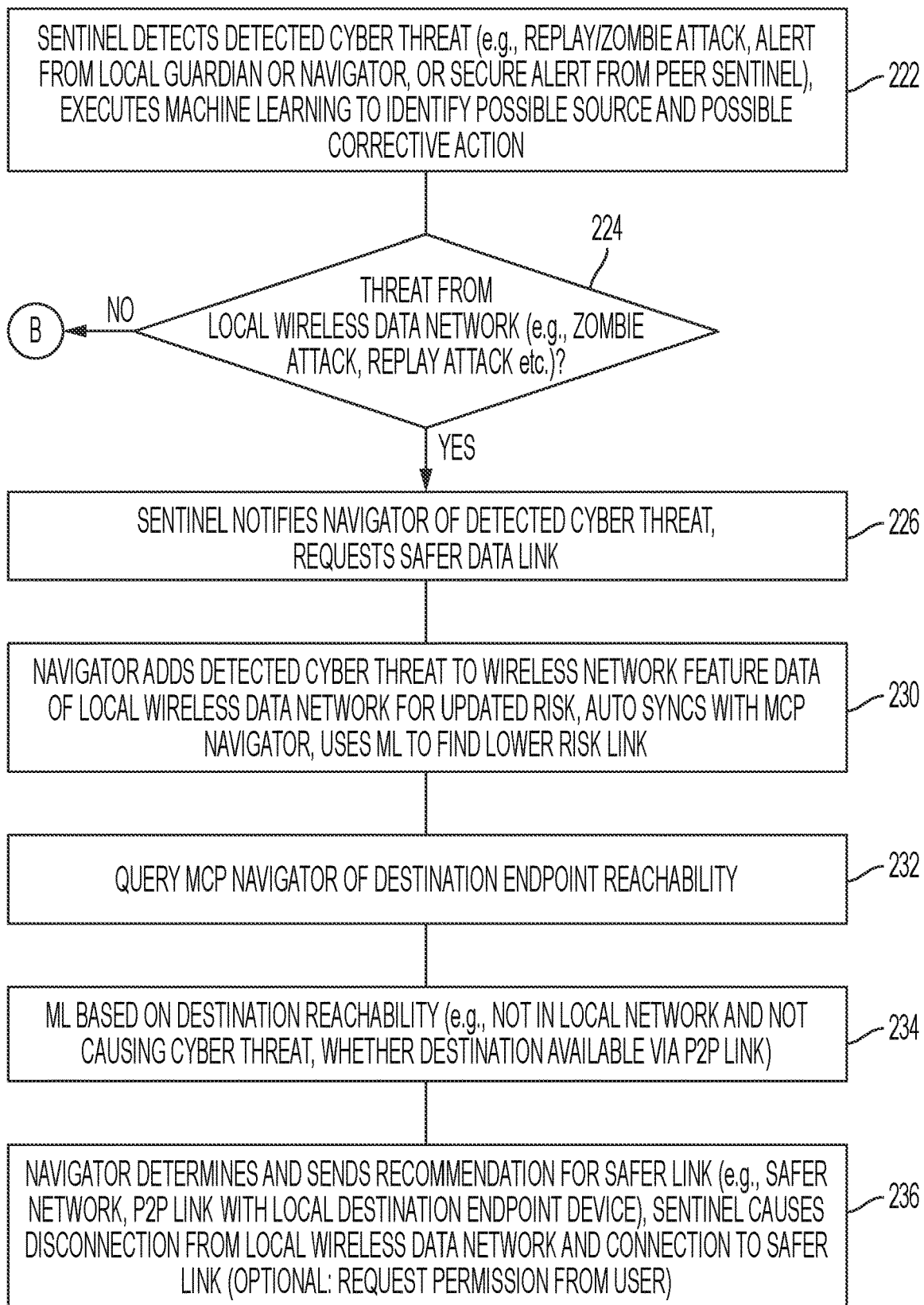

Referring to FIG. 10D, the guardian security agent 66, the sentinel security agent 68, and the navigator security agent 70 in a physical network device 88 also can execute less substantial mitigation operations to maintain secure communications autonomically with reduced risk of cyber threats. For example, the sentinel security agent 68 of the endpoint device "A" 12 in operation 22 can detect a cyber threat, for example a replay attack or a "zombie" attack by a network device in the same local data network.

The sentinel security agent 68 can detect a replay attack based on executing a prescribed hash on each encrypted temporal key 178 within a received secure data packet 158. In particular, the encrypted temporal key 178 not only ensures that the destination device is the only network device in the secure peer-to-peer data network 5 that can decrypt the encrypted payload 204: the encrypted temporal key 178 also provides for the secure data packet 174 a cryptographically-unique encrypted bitstring, also referred to herein as a "nonce" (or "nounce"), that enables any physical network device 88 receiving the secure data packet 158 to verify the secure data packet 158 is not a copy of a prior transmitted data packet (indicating a replay attack).

Hence, the sentinel security agent 68 of an endpoint device 12 can respond to receiving in operation 230 a secure data packet 158 (or the sentinel security agent 68 of a replicator device 16 can respond to receiving a secure forwarded data packet 164 of FIG. 8) by retrieving an encrypted bitstring from the "encrypted temporal key field" 178, and executing in operation 222 its own prescribed hash (e.g., using its own unique hash parameters) to generate a hashed value of at least a portion of the encrypted bitstring (corresponding to the encrypted temporal key 178). The sentinel security agent 68 can compare the hashed value with other stored hash values (e.g., previously stored in operation 222 in a data structure within its memory circuit 94) to determine whether the hashed value equals a prior instance of a hashed value for a prescribed time interval (e.g., one minute).

It is mathematically impossible for hashes of different encrypted temporal keys 178 to have an identical hash value unless the data packet 158 (or 164) is copied: hence, the sentinel security agent 68 executed by the processor circuit 92 of any physical network device 88 can determine in operation 222 that the secure data packet 158 (or 164) is not a copy based on a determined absence of a prior instance of the prescribed hash, and can continue processing the secure data packet 158, including storing the prescribed hash for future comparisons for subsequently-received secure data packets 158 or 164, for example for a corresponding identified source-destination flow.

Conversely, any sentinel security agent 68 can detect a replay attack in response to determining the prescribed hash from the received secure data packet 158 matches a prior instance of the prescribed hash on a previously-received secure data packet 158, indicating the secure data packet received in operation 230 is a copy of a previously-received data packet.

Hence, the sentinel security agent 68 of the receiving network device (12 or 16) in operation 222 can detect a replay attack based on detecting a second instance of a prescribed hash of the encrypted temporal key 178. The sentinel security agent 68 also can detect a cyber threat based on an alert notification from the local guardian security agent 66 or the local navigator security agent 70; the sentinel security agent 68 of the receiving network device (12 or 16) in operation 222 also can receive a secure alert from a peer sentinel security agent 68. The sentinel security agent 68 in operation 222 also can execute machine learning to identify possible sources of the cyber threat and to determine possible corrective action.

For example, if in operation 224 the sentinel security agent 68 of the receiving network device (12 or 16) determines the cyber threat is from a local wireless data network (e.g., based on detecting a replay attack or a "zombie" attack from a neighboring network device that is infected with malware), the sentinel security agent 68 of the receiving network device (12 or 16) can send in operation 226 a notification to the local navigator security agent 70 of the detected cyber threat, including a request for a safer data link.

The navigator security agent 70 in the receiving network device (12 or 16) can respond to the detected cyber threat by adding the detected cyber threat to its wireless network feature data for the current local wireless data network to indicate an updated risk; the navigator security agent 70 in operation 230 also can autonomically synchronize with the navigator security agent 70 of the MCP device 14, and execute machine learning to identify a lower risk link.

In one example, the navigator security agent 70 of the receiving network device (12 or 16) in operation 232 can query the navigator security agent 70 of the MCP device 14 to determine the reachability of a destination endpoint, for example in the case of the querying endpoint device "A" 12 requesting the MCP device 14 to identify a destination IP address for the destination endpoint device "B" 12. The navigator security agent 70 of the MCP device 14 can respond by providing an IP address used by the endpoint device "B" 12 behind a firewall device "FW2" 88 (e.g., a private 10.x.x.x address), as identified for example in the signet of the endpoint device "B" 12. Hence, the navigator security agent 70 of the receiving network device (12 or 16) in operation 234 can determine from the response from the navigator security agent 70 in the MCP device 14 that that the attack is a "zombie" attack based on confirming the destination endpoint device "B" 12 is using the same private network address in a different local network (behind the firewall device "FW2" 152); in other words, the navigator security agent 70 of the receiving network device (e.g., the endpoint device "A" 12) in operation 234 can determine from the reply by the navigator security agent 70 in the MCP device 14 that the endpoint device "B" 12 is not in the same wireless data network utilized by the receiving network device (e.g. endpoint device "A" 12) (behind the firewall device "FW1" 152), and that the endpoint device "B" 12 is not causing the detected cyber threat. Rather, the navigator security agent 70 of the receiving network device (e.g., the endpoint device "A" 12) in operation 234 can determine the detected cyber threat ("zombie" attack) is caused by another network device in the same wireless data network as the receiving network device (e.g., endpoint device "A" 12) (behind the firewall device "FW1" 152) and utilizing the same private network address (e.g., a private 10.x.x.x address) as the endpoint device "B" 12 in its corresponding wireless data network (behind the firewall device "FW2" 152).

Hence, the navigator security agent 70 of the receiving network device (e.g., endpoint device "A" 12) in operation 236 can determine and send to its local sentinel security agent 68 a recommendation for a safer data link that avoids the cyber threat during communications in the secure peer-to-peer data network 5: the recommended safer data link can be any one of a safer local WiFi network (e.g., a private WiFi hotspot of a trusted neighboring network device as opposed to a public WiFi network offered by a coffee shop), a 5G data link, or a P2P connection if the destination device becomes locally available.

The sentinel security agent 68 of the receiving network device (e.g., endpoint device "A" 12) in operation 236 can cause the device interface circuit 90 of the physical network device 88a to automatically disconnect from the "unsafe" wireless data network that is susceptible to the cyber threat, and attach to the "safe" data network recommended by the navigator security agent 70, for example based on an auto-mitigation policy that can be set by the user of the endpoint device "A" 12. The sentinel security agent 68 of the receiving network device in operation 236 also can send a notification to the user interface (UI) display 218 requesting confirmation of the disconnection from the "unsafe" wireless network and attachment to the "safe" data network: the sentinel security agent 68 can respond to a user input approving of the corrective action by causing the device interface circuit 90 to disconnect from the "unsafe" data network and attach to the "safe" data network.

Hence, FIG. 10D illustrates that the sentinel security agent 68 and the navigator security agent 70 can coordinate mitigation of a detected cyber threat by determining the "unsafe" wireless data network is the source of the detected cyber threat, and in response disconnecting from the "unsafe" wireless data network and connecting to a "safe" data network that can avoid the cyber threat.

Figure 10E:
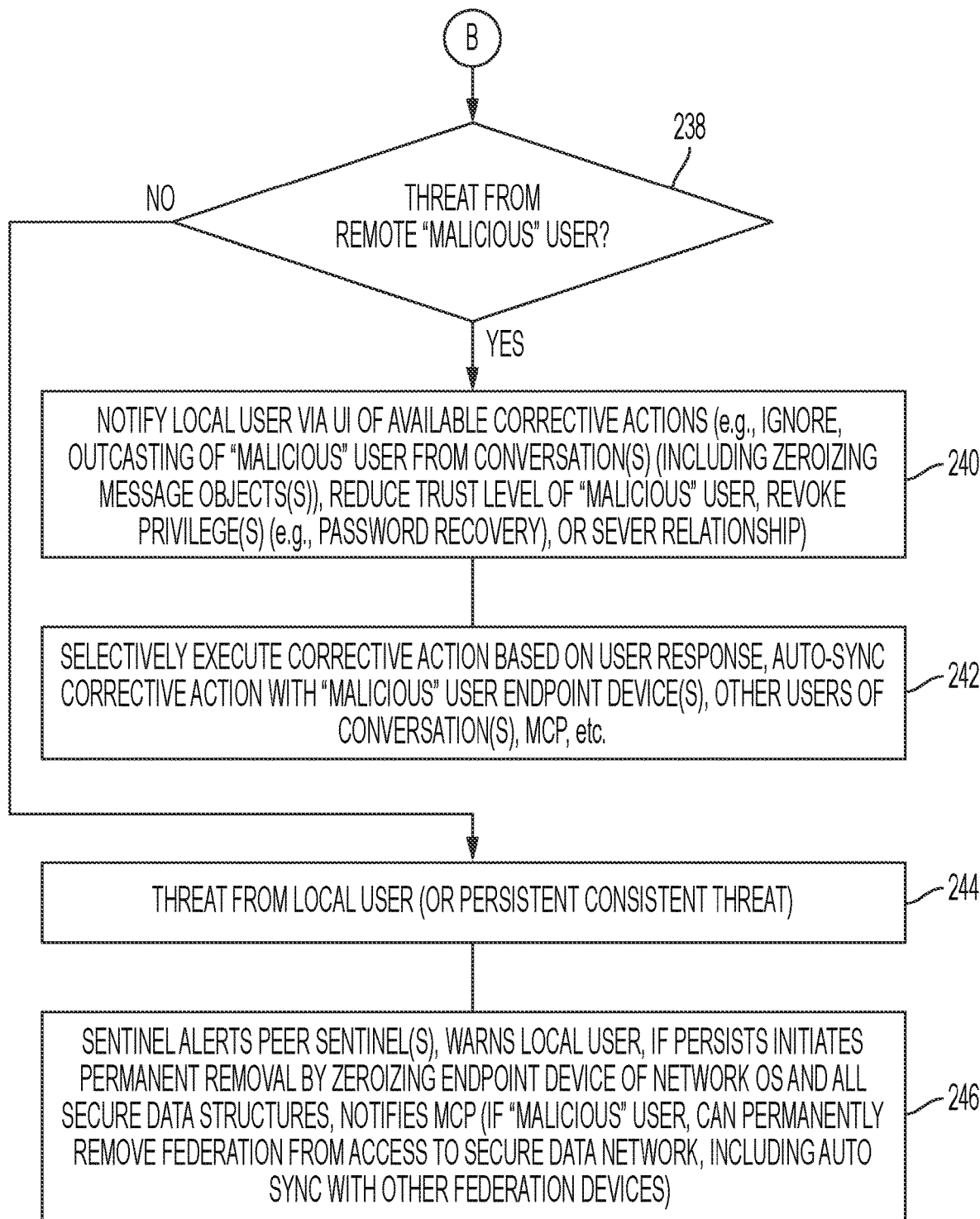

If, however, the sentinel security agent 68 of the receiving network device (e.g., endpoint device "A" 12) in operation 224 determines the cyber threat is not due to the local wireless data network (behind the firewall device "FW1" 152), the sentinel security agent 68 in operation 238 of FIG. 10E can determine whether the threat is from a remote "suspect" user that is reachable via the secure private core network 10 (e.g., the user of the federation "F3" utilizing the endpoint device "C" 12).

In response to the sentinel security agent 68 of the receiving network device (e.g., endpoint device "A" 12) determining the cyber threat is due to a remote "suspect" user (e.g., the user of the federation "F3" utilizing the endpoint device "C" 12), the sentinel security agent 68 of the receiving network device (e.g., endpoint device "A" 12) in operation 240 can notify the local targeted user "F1" via the user interface (UI) display 218 of available corrective actions depending on the nature of the cyber threat, as described previously with respect to operation 218 of FIG. 10C.

For example, identity theft protection by the sentinel security agent 68 can be based on detecting that the suspect user "F3" of the endpoint device "C" 12 has effectively betrayed a trust with the targeted user "F1" of the endpoint device "A" 12, for example by attempting to hack the targeted user's password based on improper use of a pre-scribed password recovery scheme shared by the targeted user "F1" with the suspect user "F3". The sentinel security agent 68 in the endpoint device "C" 12 can detect the suspect user "F3" attempting to hack the prescribed password recovery scheme, and in response send a notification to the sentinel security agent 68 in the endpoint device "A" 12 of the targeted user "F1". The notification enables the sentinel security agent 68 in the endpoint device "A" 12 of the targeted user "F1" in operation 240 to present to the user interface (UI) display 218 a menu of available mitigation options: example mitigation options can include ignore (e.g., if targeted user "F1" can confirm that the suspect user "F3" made an error during a legitimate password recovery operation), reducing the trust level of the suspect user "F3" from full trust to nominal trust, or revoking a relationship privilege previously extended to the suspect user "F3" (e.g., revoking the password recovery privilege), etc. Hence, the targeted user "F1" in operation 240 can decide whether the notification is due to an inadvertent error by the identified user during a legitimate password recovery, or whether the notification identifies a malicious attempt by the identified user to gain unauthorized access to the secure data objects of the targeted user, enabling the targeted user to selectively outcast the identified user from the prescribed password recovery scheme.

The targeted user "F1" in operation 240 also can select other mitigation options that reduce the trust level based on the detected cyber threat, depending on the cyber threat detected by the sentinel security agent 68, including: zeroizing a message object 36 owned by the targeted user "F1" and previously shared with the suspect user "F3", outcasting the suspect user "F3" from a conversation as described with respect to operation 218 of FIG. 10C, or revoke or sever two-way trusted relationship with the suspect user "F3", etc.

The sentinel agent 68 executed in the endpoint device "A" 12 can respond in operation 242 by selectively executing a corrective action based on the user response, as described previously for example with respect to operation 220, including outcasting the suspect user "F3" from one or more conversations, zeroizing one or more message objects 36 stored on the endpoint device "C" 12 in the federation "F3" 34 owned by the malicious user, and/or severing the two-way trusted relationship between the targeted user "F1" and the malicious user "F3", resulting in a severing by the sentinel security agent 68 in the endpoint device "A" 12 of the two-way trusted relationship between the endpoint device "A" 12 and the endpoint device "C" 12. As described previously with respect to operation 242, the sentinel security agent 68 in the endpoint device "A" 12 can cause autonomous synchronization with sentinel security agents 68 in respective trusted peer devices (e.g., the endpoint device "A1" 12, the MCP device 14, the endpoint device "C" 12, and the endpoint device "B" 12), in order to instantly implement the corrective action throughout the secure peer-to-peer data network 5.

Hence, the autonomic coordination between the sentinel security agent 68 executed in the endpoint device "C" 12 and the sentinel security agent 68 executed in the endpoint device "A" 12 enable instant corrective action to mitigate against the cyber threat attempted by the malicious user "F3".

Referring to FIG. 10E, if in operation 238 the sentinel security agent 68 in the endpoint device "A" 12 determines the cyber threat is not from a remote malicious user, but determines in operation 244 that the threat is from the local user "F1" (or is a persistent consistent threat caused by malicious executable code in the endpoint device "A" 12), the sentinel security agent 68 in the endpoint device "A" 12 in operation 246 can warn the user "F1" via the user interface (UI) display 218 (as described previously with respect to operation 214). If the user "F1" persists, the sentinel security agent 68 in the endpoint device "A" 12 can initiate permanent removal of the federation "F1" from the secure peer-to-peer data network 5 based on notifying the corresponding sentinel security agent 68 in the MCP device 14 that the user "F1" of the endpoint device "A" 12, and the endpoint devices "A" and "A1" belonging to the federation "F1" 34, are to be removed permanently from the secure peer-to-peer data network 5. The sentinel security agent 68 in the endpoint device "A" 12 in operation 246 also can zeroize (i.e., cryptographically erase) the network operating system 56 and all data objects 22, 36, and 42 associated with the secure communications in the secure peer-to-peer data network 5 by the user "F1", preventing further use of the endpoint device "A" 12 for any secure communications in the secure peer-to-peer data network 5.

Hence, the autonomic synchronization with the sentinel security agent 68 of the MCP device 14 can cause the MCP device 14 to autonomically synchronize with all endpoint devices having any relationship with the federation "F1" 34 (e.g., having a reference to the federation ID "F1" 18), ensuring the malicious user of the federation "F1" 34 is permanently removed from access to the secure peer-to-peer data network 5 via any network device 88. The sentinel security agent 68 of the MCP device 14 also can maintain a "banned user" list that identifies the banned user by the hash "HASH[P1@AA.com]" of the email address "P1@AA.com" used by the user.

According to example embodiments, an AI-based security suite is implemented in a network operating system that prevents any executable resource in a network device from accessing a secure peer-to-peer data network, or any unencrypted "in-flight" or "at-rest" data structure associated with the secure peer-to-peer data network, without authorized access via a prescribed Application Programming Interface (API) required by the secure executable container. The AI-based security suite includes specialized security agents that can provide coordinated protection for real-time protection of executable code and secured data structures, real-time threat detection, and real-time secure connection management. The specialized security agents also can autonomically synchronize with other specialized security agents in the secure peer-to-peer data network, enabling aggregated learning of Machine Language-based decision trees by the specialized security agents, and instantaneous execution of corrective actions throughout the secure peer-to-peer data network. The AI-based security suite also enables a network device encountering the persistent consistent threat to execute a cryptographic self-destruction to prevent further spread of the persistent consistent threat.

Although the example embodiments illustrate the pairwise topology of two-way trusted replicator devices as a mesh of trusted replicator devices, other topologies (e.g., star, tree, hybrid, etc.) can be used to deploy the pairwise topology of two-way trusted replicator devices.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

encrypting, by a security agent in a secure executable container executed within a network device operable as a first user endpoint device, first data structures into first secure data structures for secure storage in the network device and second data structures into second secure data structures for secure communications of the second secure data structures in a secure peer-to-peer data network comprising two or more network devices including the first user endpoint device operable by a first user having exclusive possession and control of the first user endpoint device and a second user endpoint device operable by a second user having exclusive possession and control of the second user endpoint device, the secure peer-to-peer data network requiring each network device in the secure peer-to-peer data network to comprise and execute the secure executable container;

monitoring, by the security agent, a corresponding mandatory lifecycle policy for each of the first secure data structures; and cryptographically erasing one of the first secure data structures in response to expiration of the corresponding mandatory lifecycle policy;

the secure executable container in the first and second user endpoint devices causing a first secure conversation between the respective first and second users of the first and second user endpoint devices, and the secure executable container in the first and second user endpoint devices further causing a second secure communication between the security agent in the first user endpoint device and a security agent in the second user endpoint device.

2. The method of claim 1, further comprising:

establishing, by the security agent, a two-way trusted relationship with the second user endpoint device in the secure peer-to-peer data network based on both the first user and the second user agreeing to establishing the two-way trusted relationship according to a prescribed salutation protocol, and further based on the security agent validating the second user endpoint device;

autonomically synchronizing first cyber-attack feature data generated by the security agent in the first user endpoint device with second cyber-attack feature data generated by the security agent in the second user endpoint device, for autonomic aggregation of machine learning-based cyber-attack feature data in the secure peer-to-peer data network and for distributed threat detection and mitigation in the secure peer-to-peer data network.

3. The method of claim 2, wherein:

the establishing includes receiving a secure public key generated by the security agent in the second user endpoint device;

the encrypting including encrypting a payload of each of the second data structures to be sent to the second user endpoint device into a corresponding encrypted payload with a corresponding dynamically-generated temporal key generated by the security agent, and encrypting the dynamically-generated temporal key into a corresponding encrypted temporal key with the secure public key generated by the security agent in the second user endpoint device, and adding the corresponding encrypted payload and the corresponding encrypted temporal key to the corresponding second secure data structure of the second secure data structures sent to the second user endpoint device;

the method further comprising the security agent generating a private key and a corresponding public key, the security agent generating for each of the second secure data structures a corresponding signature using the private key, and attaching to said each second secure data structure the corresponding signature.

4. The method of claim 3, wherein the encrypting includes generating the dynamically-generated temporal key as a time-based key.

5. The method of claim 1, further comprising:
detecting, by the security agent, a cyber-attack on at least one of executable code in the network device, one of the first secure data structures, or one of the second secure data structures;
generating, by the security agent, first updated cyber-attack feature data for machine learning-based cyber-attack feature data; and
autonomically synchronizing the first updated cyber-attack feature data with second cyber-attack feature data generated by the security agent in the second user endpoint device, including updating a locally stored set of updated cyber-attack feature data, comprising at least a prescribed minimum set of cyber-attack feature data, with the updated cyber-attack feature data, for distributed threat detection and mitigation in the secure peer-to-peer data network.

6. The method of claim 5, further comprising notifying a second security agent executed within the network device of the cyber-attack, causing the second security agent to execute secure mitigation operations to halt the cyber-attack.

7. The method of claim 1, further comprising:
detecting an unauthorized recording attempt of a network communication by the first user of the first user endpoint device; and
responding to the unauthorized recording attempt by one of blocking the unauthorized recording attempt by the first user, or notifying a second security agent executed within the first user endpoint device of the unauthorized recording attempt, causing the second security agent to notify a corresponding second security agent executed within the second user endpoint device operated by the second user associated with the network communication.

8. The method of claim 1, wherein:
the security agent is executed in each network device in the secure peer-to-peer data network;
each network device is one of a user endpoint device, an Internet of Things (IoT) device, or a network computing device.

9. The method of claim 1, further comprising:
detecting, by the security agent, that a password utilized by the first user for securing the network device is approaching a determined password lifetime expiration, the determined password lifetime expiration based on a comparison of the password relative to a start time and known cryptographic hacking techniques;
notifying, by the security agent, of the determined password lifetime expiration, requiring the first user to update to a new password having a sufficient strength over a prescribed minimum password lifetime relative to the known cryptographic hacking techniques.

10. The method of claim 1, wherein:
the secure executable container prevents any executable resource external to the secure executable container and executable in the network device from:
accessing any unencrypted form of any first secure data structure without authorized access via a prescribed Application Programming Interface (API) required by and executed within the secure executable container,
accessing any unencrypted form of any second secure data structure sent or received by the secure executable container via the secure peer-to-peer data network without authorized access via a prescribed API required by and executed within the secure executable container, and
accessing the secure peer-to-peer data network without authorized access via a prescribed API required by and executed within the secure executable container.

11. The method of claim 1, further comprising:
generating, by the security agent executed within the network device, a private key for the corresponding network device and a corresponding public key, wherein each corresponding security agent in each network device generates a corresponding private key and a corresponding public key for the corresponding network device;
wherein the encrypting includes the security agent encrypting the first data structures and the second data structures using the private key.

12. The method of claim 1, wherein the cryptographically erasing includes causing each network device in the secure peer-to-peer data network that stores a corresponding copy of the one of the first secure data structures to cryptographically erase the corresponding copy.

13. One or more non-transitory tangible media encoded with logic for execution by a machine and when executed by the machine operable for:
encrypting, by the machine implemented as a network device operable as a first user endpoint device and executing a secure executable container comprising a security agent, first data structures into first secure data structures for secure storage in the network device and second data structures into second secure data structures for secure communications of the second secure data structures in a secure peer-to-peer data network comprising two or more network devices including the first user endpoint device operable by a first user having exclusive possession and control of the first user endpoint device and a second user endpoint device operable by a second user having exclusive possession and control of the second user endpoint device, the secure peer-to-peer data network requiring each network device in the secure peer-to-peer data network to comprise and execute the secure executable container, the one or more non-transitory tangible media implemented as the secure executable container comprising the security agent;
monitoring a corresponding mandatory lifecycle policy for each of the first secure data structures; and
cryptographically erasing one of the first secure data structures in response to expiration of the corresponding mandatory lifecycle policy;
the secure executable container in the first and second user endpoint devices causing a first secure conversation between the respective first and second users of the first and second user endpoint devices, and the secure executable container in the first and second user endpoint devices further causing a second secure communication between the security agent in the first user endpoint device and a security agent in the second user endpoint device.

14. The one or more non-transitory tangible media of claim 13, further operable for:
  establishing, by the security agent, a two-way trusted relationship with the second user endpoint device in the secure peer-to-peer data network based on both the first user and the second user agreeing to establishing the two-way trusted relationship according to a prescribed salutation protocol, and further based on the security agent validating the second user endpoint device;
  autonomically synchronizing first cyber-attack feature data generated by the security agent in the first user endpoint device with second cyber-attack feature data generated by the security agent in the second user endpoint device, for autonomic aggregation of machine learning-based cyber-attack feature data in the secure peer-to-peer data network and for distributed threat detection and mitigation in the secure peer-to-peer data network.

15. The one or more non-transitory tangible media of claim 14, wherein:
  the establishing includes receiving a secure public key generated by the security agent in the second user endpoint device;
  the encrypting including encrypting a payload of each of the second data structures to be sent to the second user endpoint device into a corresponding encrypted payload with a corresponding dynamically-generated temporal key generated by the security agent, and encrypting the dynamically-generated temporal key into a corresponding encrypted temporal key with the secure public key generated by the security agent in the second user endpoint device, and adding the corresponding encrypted payload and the corresponding encrypted temporal key to the corresponding second secure data structure of the second secure data structures sent to the second user endpoint device;
  the one or more non-transitory tangible media further operable for the security agent generating a private key and a corresponding public key, the security agent generating for each of the second secure data structures a corresponding signature using the private key, and attaching to said each second secure data structure the corresponding signature.

16. The one or more non-transitory tangible media of claim 13, further operable for:
  detecting, by the security agent, a cyber-attack on at least one of executable code in the network device, one of the first secure data structures, or one of the second secure data structures;
  generating, by the security agent, first updated cyber-attack feature data for machine learning-based cyber-attack feature data; and
  autonomically synchronizing the first updated cyber-attack feature data with second cyber-attack feature data generated by the security agent in the second user endpoint device, including updating a locally stored set of updated cyber-attack feature data, comprising at least a prescribed minimum set of cyber-attack feature data, with the updated cyber-attack feature data, for distributed threat detection and mitigation in the secure peer-to-peer data network.

17. The one or more non-transitory tangible media of claim 16, further operable for notifying a second security agent executed within the network device of the cyber-attack, causing the second security agent to execute secure mitigation operations to halt the cyber-attack.

18. The one or more non-transitory tangible media of claim 13, further operable for:
  detecting an unauthorized recording attempt of a network communication by the first user of the first user endpoint device; and
  responding to the unauthorized recording attempt by one of blocking the unauthorized recording attempt by the first user, or notifying a second security agent executed within the first user endpoint device of the unauthorized recording attempt, causing the second security agent to notify a corresponding second security agent executed within the second user endpoint device operated by the second user associated with the network communication.

19. The one or more non-transitory tangible media of claim 13, wherein:
  the security agent is executed in each network device in the secure peer-to-peer data network;
  each network device is one of a user endpoint device, an Internet of Things (IoT) device, or a network computing device.

20. The one or more non-transitory tangible media of claim 13, further operable for:
  detecting, by the security agent, that a password utilized by the first user for securing the network device is approaching a determined password lifetime expiration, the determined password lifetime expiration based on a comparison of the password relative to a start time and known cryptographic hacking techniques;
  notifying, by the security agent, of the determined password lifetime expiration, requiring the first user to update to a new password having a sufficient strength over a prescribed minimum password lifetime relative to the known cryptographic hacking techniques.

21. The one or more non-transitory tangible media of claim 13, wherein:
  the secure executable container prevents any executable resource external to the secure executable container and executable in the network device from:
    accessing any unencrypted form of any first secure data structure without authorized access via a prescribed Application Programming Interface (API) required by and executed within the secure executable container,
    accessing any unencrypted form of any second secure data structure sent or received by the secure executable container via the secure peer-to-peer data network, without authorized access via a prescribed API required by and executed within the secure executable container, and
    accessing the secure peer-to-peer data network without authorized access via a prescribed API required by and executed within the secure executable container.

22. An apparatus implemented as a physical machine, the apparatus comprising:
  non-transitory machine readable media configured for storing executable machine readable code;
  a device interface circuit; and
  a processor circuit configured for executing the machine readable code, and when executing the machine readable code operable for:
  encrypting, by a security agent in a secure executable container executed in the apparatus implemented as a network device operable as a first user endpoint device, first data structures into first secure data structures for secure storage in the network device and second data structures into second secure data structures for secure communications of the second secure data structures in a secure peer-to-peer data network comprising two or more network devices including the first user endpoint device operable by a first user having exclusive possession and control of the first user endpoint device and a second user endpoint device operable by a second user having exclusive possession and control of the second user endpoint device, the secure peer-to-peer data network requiring each network device in the secure peer-to-peer data network to comprise and execute the secure executable container, the machine readable code implemented as the secure executable container comprising the security agent;

monitoring a corresponding mandatory lifecycle policy for each of the first secure data structures; and cryptographically erasing one of the first secure data structures in response to expiration of the corresponding mandatory lifecycle policy;

the secure executable container in the first and second user endpoint devices causing a first secure conversation between the respective first and second users of the first and second user endpoint devices, and the secure executable container in the first and second user endpoint devices further causing a second secure communication between the security agent in the first user endpoint device and a security agent in the second user endpoint device.

23. The apparatus of claim 22, wherein:

the secure executable container prevents any executable resource external to the secure executable container and executable in the network device from:
- accessing any unencrypted form of any first secure data structure without authorized access via a prescribed Application Programming Interface (API) required by and executed within the secure executable container,
- accessing any unencrypted form of any second secure data structure sent or received by the secure executable container via the secure peer-to-peer data network without authorized access via a prescribed API required by and executed within the secure executable container, and
- accessing the secure peer-to-peer data network without authorized access via a prescribed API required by and executed within the secure executable container.

\* \* \* \* \*